US012244050B2

(12) United States Patent
Furutani

(10) Patent No.: US 12,244,050 B2
(45) Date of Patent: Mar. 4, 2025

(54) DIRECTIONAL COUPLER, HIGH-FREQUENCY MODULE, AND COMMUNICATION APPARATUS

(71) Applicant: Murata Manufacturing Co., Ltd., Kyoto (JP)

(72) Inventor: Koji Furutani, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 301 days.

(21) Appl. No.: 18/057,951

(22) Filed: Nov. 22, 2022

(65) Prior Publication Data

US 2023/0208003 A1 Jun. 29, 2023

(30) Foreign Application Priority Data

Dec. 28, 2021 (JP) ................................ 2021-214796

(51) Int. Cl.
*H01P 5/18* (2006.01)

(52) U.S. Cl.
CPC ...................................... *H01P 5/18* (2013.01)

(58) Field of Classification Search
CPC ................................... H01P 5/18; H01P 5/187
See application file for complete search history.

(56) References Cited

U.S. PATENT DOCUMENTS 5,363,071 A * 11/1994 Schwent .................. H01P 5/04 333/17.1
2010/0171564 A1* 7/2010 Yamamoto ............... H01P 5/18 333/116
2011/0057746 A1* 3/2011 Yamamoto ............... H01P 5/18 333/116
2021/0036396 A1 2/2021 Seki et al.

FOREIGN PATENT DOCUMENTS

JP 2021-027426 A 2/2021

* cited by examiner

*Primary Examiner* — Quan Tra
(74) *Attorney, Agent, or Firm* — McDonald Hopkins LLC

(57) ABSTRACT

A directional coupler includes a main line, a first sub-line, a second sub-line, a termination circuit, a selector switch, and a short-circuiting switch. The termination circuit terminates at least one of the first sub-line and the second sub-line. The selector switch connects the first sub-line and the termination circuit in a first mode and connects the second sub-line and the termination circuit in a second mode. The short-circuiting switch short-circuits both ends (a first end and a second end) of the second sub-line in the first mode.

13 Claims, 11 Drawing Sheets

DIRECTIONAL COUPLER, HIGH-FREQUENCY MODULE, AND COMMUNICATION APPARATUS

CROSS REFERENCE TO RELATED APPLICATION

This application claims priority from Japanese Patent Application No. 2021-214796 filed on Dec. 28, 2021. The content of this application is incorporated herein by reference in its entirety.

BACKGROUND ART

The present disclosure generally relates to a directional coupler, a high-frequency module, and a communication apparatus, and more particularly to a directional coupler including a main line and a plurality of sub-lines, a high-frequency module including the directional coupler, and a communication apparatus including the high-frequency module.

Japanese Unexamined Patent Application Publication No. 2021-27426 describes a directional coupler including a main line, a first sub-line, a second sub-line, a termination circuit, and a switch circuit (selector switch). Each of the first sub-line and the second sub-line has a line length corresponding to a frequency of a signal to be detected. In the directional coupler described in Japanese Unexamined Patent Application Publication No. 2021-27426, the switch circuit switches between a state where the first sub-line and the termination circuit are connected and a state where the second sub-line and the termination circuit are connected.

BRIEF SUMMARY

In the directional coupler described in Japanese Unexamined Patent Application Publication No. 2021-27426, if the switch circuit connects one sub-line of the first sub-line and the second sub-line to the termination circuit, the other sub-line of the first sub-line and the second sub-line enters a disconnected (open) state of being not connected to any circuit. Even if the other sub-line is in the disconnected state, a part of a signal transmitted through the main line may leak out from the main line to the other sub-line in the disconnected state to cause signal loss.

The present disclosure provides a directional coupler, a high-frequency module, and a communication apparatus capable of reducing loss of a signal transmitted through a main line.

A directional coupler according to an aspect of the present disclosure includes a main line, a first sub-line, a second sub-line, a termination circuit, a selector switch, and a short-circuiting switch. The termination circuit terminates at least one of the first sub-line and the second sub-line. The selector switch connects the first sub-line and the termination circuit in a first mode and connects the second sub-line and the termination circuit in a second mode. The short-circuiting switch short-circuits both ends of the second sub-line in the first mode.

A high-frequency module according to an aspect of the present disclosure includes the above-described directional coupler and an antenna switch. The antenna switch is connected to an antenna terminal.

A communication apparatus according to an aspect of the present disclosure includes the above-described high-frequency module and a signal processing circuit. The signal processing circuit is connected to the high-frequency module.

The directional coupler, the high-frequency module, and the communication apparatus according to the one aspect of the present disclosure can reduce loss of a signal transmitted through the main line.

DETAILED DESCRIPTION

Figure 1:
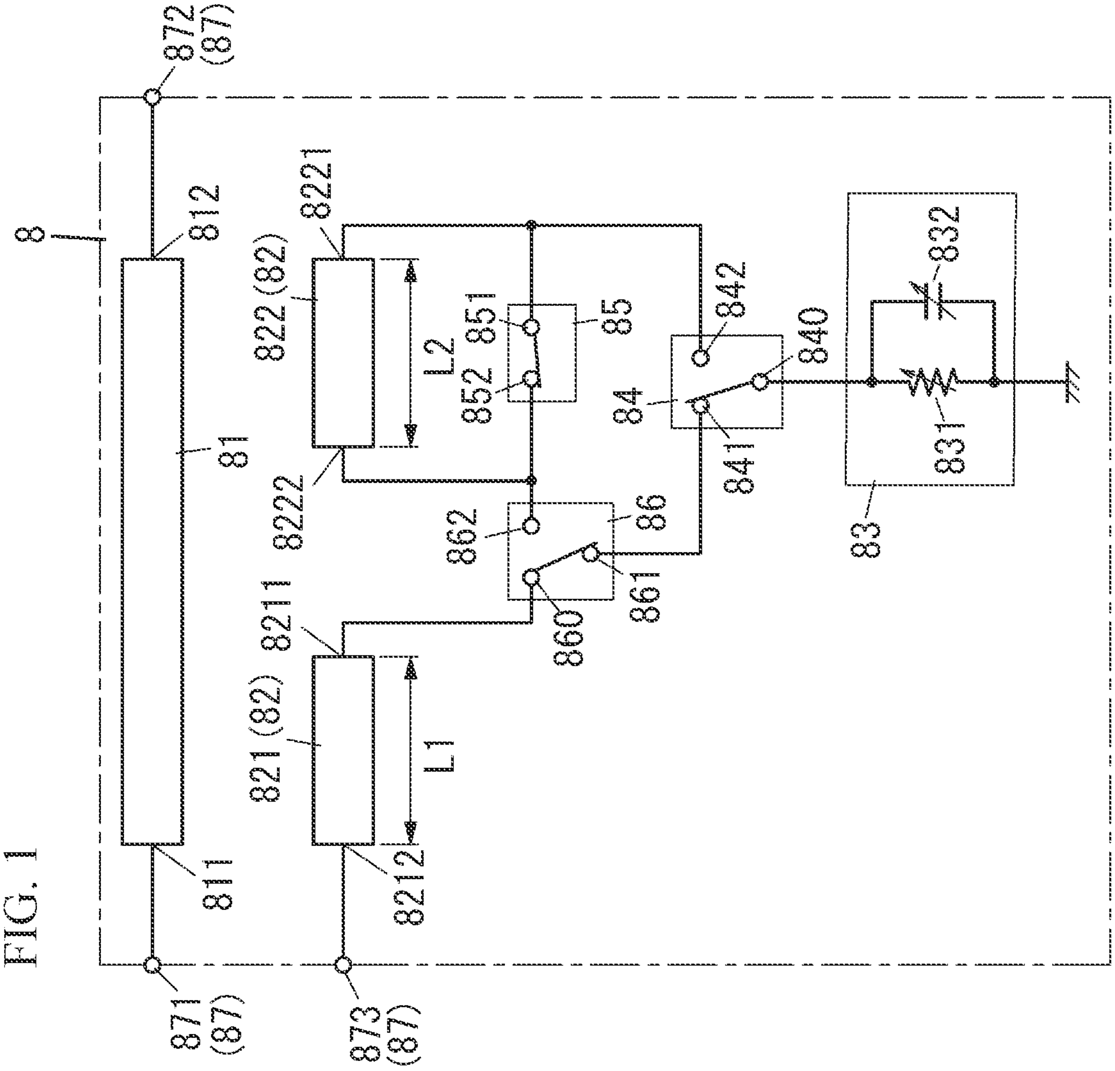
FIG. 1 is a circuit diagram showing a first mode of a directional coupler according to a first embodiment.

FIGS. 4 to 8 to be referred to in embodiments and the like below are all schematic views, and ratios in size and thickness between constituent elements in the drawings do not necessarily reflect actual dimensional ratios.

First Embodiment

Figure 2:
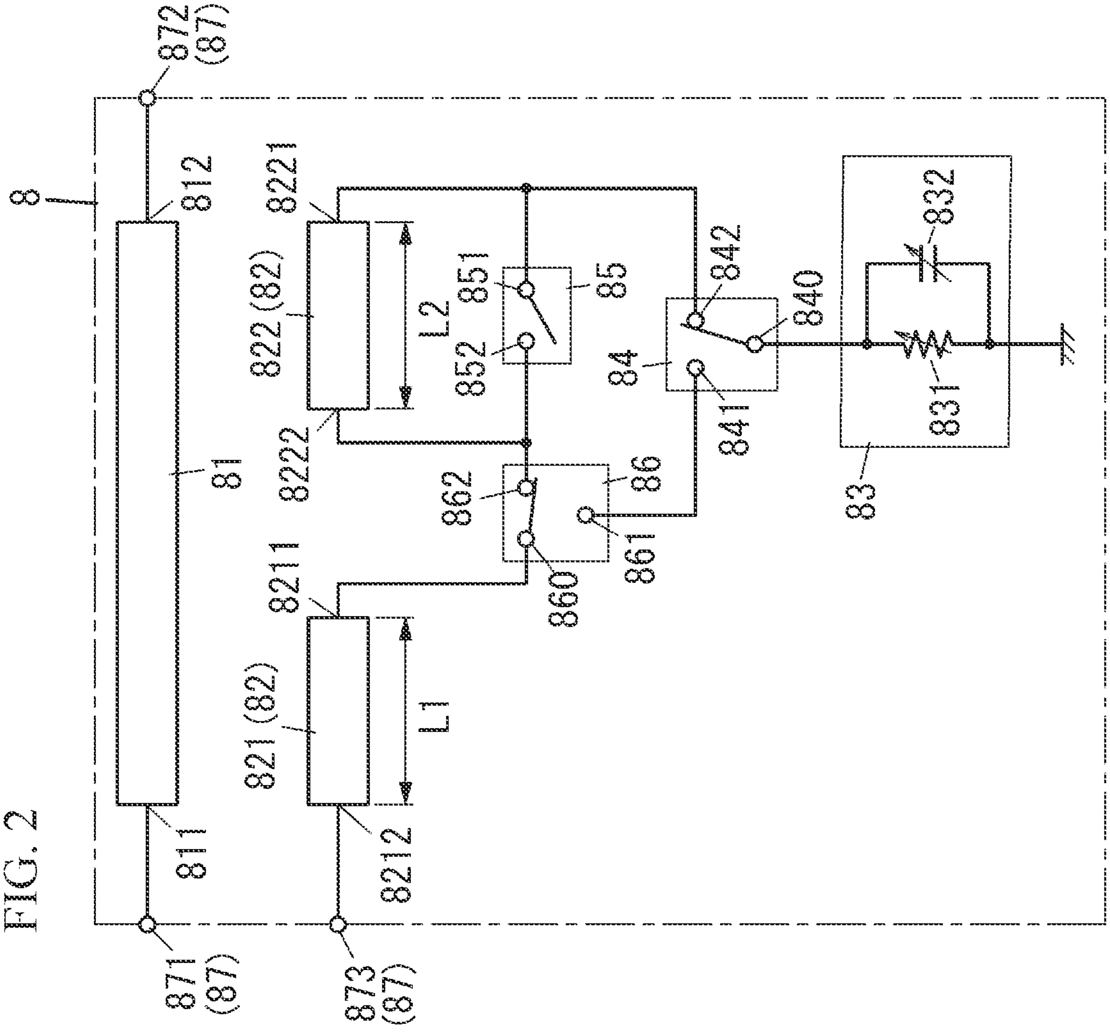
FIG. 2 is a circuit diagram showing a second mode of the directional coupler.

A directional coupler 8 according to a first embodiment includes a main line 81, a first sub-line 821, a second sub-line 822, a termination circuit 83, a first selector switch 84 as a selector switch, and a short-circuiting switch 85, as shown in FIGS. 1 and 2. The termination circuit 83 terminates at least one of the first sub-line 821 and the second sub-line 822. More particularly, the termination circuit 83 terminates the first sub-line 821 in a first mode and terminates the first sub-line 821 and the second sub-line 822 in a second mode. The first selector switch 84 connects the first sub-line 821 and the termination circuit 83 in the first mode and connects the second sub-line 822 and the termination circuit 83 in the second mode. The short-circuiting switch 85 short-circuits both ends (a first end 8221 and a second end 8222) of the second sub-line 822 in the first mode.

The first mode here is a mode of detecting a signal in a first frequency band of signals transmitted through the main line 81 in the first sub-line 821. The second mode is a mode of detecting a signal in a second frequency band of signals transmitted through the main line 81 in the first sub-line 821 and the second sub-line 822 that are series-connected. In a directional coupler, a line length of a sub-line is associated with a wavelength corresponding to a signal to be detected, and the line length of the sub-line decreases with increase in a frequency of the signal. The second frequency band is thus a band lower in frequency than the first frequency band. That is, the first mode is shorter in a line length of a sub-line than the second mode and is a high-band (HB) mode of detecting a signal of relatively high frequency, and the second mode is a low-band (LB) mode of detecting a signal of relatively low frequency.

As described above, in the directional coupler 8 according to the first embodiment, the both ends of the second sub-line 822 are short-circuited by the short-circuiting switch 85 in the first mode of detecting a signal in the first sub-line 821, and a closed circuit including the second sub-line 822 can be formed. For this reason, an electromagnetic field appearing around the second sub-line 822 can be inhibited from spreading, and the degree of coupling between the main line 81 and the second sub-line 822 can be weakened. As a result, it is possible to reduce leakage of a signal from the main line 81 to the second sub-line 822 and reduce loss of a signal transmitted through the main line 81.

(1) Directional Coupler, High-Frequency Module, and Communication Apparatus

(1.1) Configuration of High-Frequency Module

A configuration of a high-frequency module 100 according to the first embodiment will be described first with reference to FIG. 3.

Figure 3:
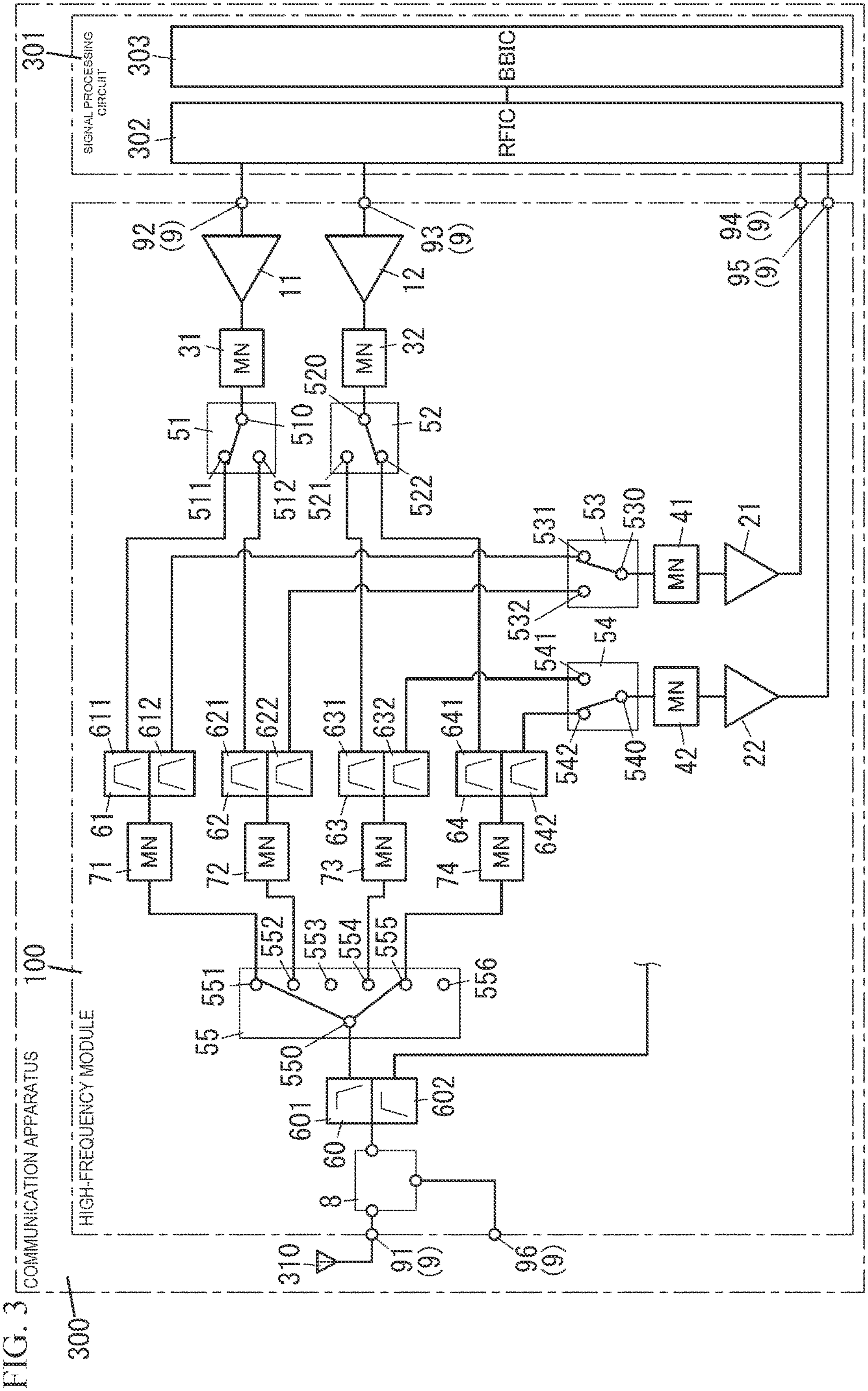
FIG. 3 is a circuit diagram of a high-frequency module and a communication apparatus including the directional coupler.

The high-frequency module 100 is used in, for example, a communication apparatus 300, as shown in FIG. 3. The communication apparatus 300 is, for example, a mobile phone, such as a smartphone. Note that the communication apparatus 300 is not limited to a mobile phone and may be, for example, a wearable terminal, such as a smartwatch. The high-frequency module 100 is, for example, a module capable of supporting standards for fourth generation mobile communication (4G), standards for fifth generation mobile communication (5G), and the like. An example of the standards for 4G is the Third Generation Partnership Project (3GPP) Long Term Evolution (LTE) standard. An example of the standards for 5G is 5G new radio (NR). The high-frequency module 100 is, for example, a module capable of supporting carrier aggregation and dual connectivity.

The communication apparatus 300 performs communication in a plurality of communication bands. More particularly, the communication apparatus 300 performs transmission of transmission signals in the plurality of communication bands and reception of reception signals in the plurality of communication bands.

Some of transmission signals and reception signals in the plurality of communication bands are frequency division duplex (FDD) signals. Note that transmission signals and reception signals in the plurality of communication bands are not limited to FDD signals and may be time division duplex (TDD) signals. FDD is a wireless communication technology for assigning different frequency bands to transmission and reception in wireless communication and performing transmission and reception. TDD is a wireless communication technology for assigning the same frequency band to transmission and reception in wireless communication and alternating between transmission and reception at time intervals.

The high-frequency module 100 includes a first power amplifier 11, a second power amplifier 12, a first switch 51, a second switch 52, and a plurality of (five in the illustrated example) filter devices 60 to 64, as shown in FIG. 3. The high-frequency module 100 further includes a first output matching circuit 31, a second output matching circuit 32, and a plurality of (four in the illustrated example) matching circuits 71 to 74. The high-frequency module 100 further includes a first low-noise amplifier 21, a second low-noise amplifier 22, a first input matching circuit 41, and a second input matching circuit 42. The high-frequency module 100 further includes a third switch 53, a fourth switch 54, and a fifth switch 55. The high-frequency module 100 further includes the directional coupler 8. The high-frequency module 100 further includes a plurality of external connection terminals 9. Note that the directional coupler 8 will be described in detail in "(1.3) Configuration of Directional Coupler".

(1.1.1) Power Amplifier

The first power amplifier 11 is, for example, an amplifier which amplifies transmission signals in a first communication band and a second communication band included in the first frequency band. The first power amplifier 11 is provided in a signal path between a plurality of transmitting filters 611 and 621 (to be described later) and a signal input terminal 92. The first power amplifier 11 has a first input terminal (not shown) and a first output terminal (not shown). The first input terminal of the first power amplifier 11 is connected to an external circuit (for example, a signal processing circuit 301) via the signal input terminal 92. The first output terminal of the first power amplifier 11 is connected to the transmitting filters 611 and 621. The first power amplifier 11 is controlled by a controller (not shown), for example. Note that the first power amplifier 11 only needs to be directly or indirectly connected to the transmitting filters 611 and 621. In the example in FIG. 3, the first power amplifier 11 is connected to the transmitting filters 611 and 621 via the first output matching circuit 31.

The second power amplifier 12 is, for example, an amplifier which amplifies transmission signals in a third communication band and a fourth communication band included in the second frequency band that is lower in frequency than the first frequency band. The second power amplifier 12 is provided in a signal path between a plurality of transmitting filters 631 and 641 (to be described later) and a signal input terminal 93. The second power amplifier 12 has a second input terminal (not shown) and a second output terminal (not shown). The second input terminal of the second power amplifier 12 is connected to an external circuit (for example, the signal processing circuit 301) via the signal input terminal 93. The second output terminal of the second power amplifier 12 is connected to the transmitting filters 631 and 641. The second power amplifier 12 is controlled by a controller, for example. Note that the second power amplifier 12 only needs to be directly or indirectly connected to the transmitting filters 631 and 641. In the example in FIG. 3, the second power amplifier 12 is connected to the transmitting filters 631 and 641 via the second output matching circuit 32.

(1.1.2) Filter Device

The filter device 61 is a duplexer (hereinafter also referred to as the "duplexer 61") having the transmitting filter 611 and a receiving filter 612. The transmitting filter 611 is, for example, a band pass filter having a transmission band of the first communication band as a pass band. The receiving filter 612 is, for example, a band pass filter having a reception band of the first communication band as a pass band.

The filter device 62 is a duplexer (hereinafter also referred to as the "duplexer 62") having the transmitting filter 621 and a receiving filter 622. The transmitting filter 621 is, for example, a band pass filter having a transmission band of the second communication band as a pass band. The receiving filter 622 is, for example, a band pass filter having a reception band of the second communication band as a pass band.

The filter device 63 is a duplexer (hereinafter also referred to as the "duplexer 63") having the transmitting filter 631 and a receiving filter 632. The transmitting filter 631 is, for example, a band pass filter having a transmission band of the third communication band as a pass band. The receiving filter 632 is, for example, a band pass filter having a reception band of the third communication band as a pass band.

The filter device 64 is a duplexer (hereinafter also referred to as the "duplexer 64") having the transmitting filter 641 and a receiving filter 642. The transmitting filter 641 is, for example, a band pass filter having a transmission band of the fourth communication band as a pass band. The receiving filter 642 is, for example, a band pass filter having a reception band of the fourth communication band as a pass band.

The filter device 60 is a diplexer (hereinafter also referred to as the "diplexer 60") having a plurality of (two in the illustrated example) filters 601 and 602. Each of the plurality of filters 601 and 602 is, for example, an LC filter. The filter 601 is, for example, a low pass filter having the first communication band, the second communication band, the third communication band, and the fourth communication band as a pass band. The filter 602 is, for example, a high pass filter having a fifth communication band as a pass band. That is, the fifth communication band is a communication band higher in frequency than the first communication band, the second communication band, the third communication band, and the fourth communication band.

(1.1.3) Output Matching Circuit

The first output matching circuit 31 is provided in a signal path between the first output terminal of the first power amplifier 11 and a common terminal 510 of the first switch 51 (to be described later). The first output matching circuit 31 is a circuit for matching an impedance of the first power amplifier 11 to impedances of the two transmitting filters 611 and 621. The first output matching circuit 31 is, for example, configured to include one inductor. The inductor of the first output matching circuit 31 is provided on an output side of the first power amplifier 11. Note that the first output matching circuit 31 is not limited to the configuration including one inductor and may be, for example, configured to include a plurality of inductors or configured to include a plurality of inductors and a plurality of capacitors.

The second output matching circuit 32 is provided in a signal path between the second output terminal of the second power amplifier 12 and a common terminal 520 of the second switch 52 (to be described later). The second output matching circuit 32 is a circuit for matching an impedance of the second power amplifier 12 to impedances of the two transmitting filters 631 and 641. The second output matching circuit 32 is, for example, configured to include one inductor. The inductor of the second output matching circuit 32 is provided on an output side of the second power amplifier 12. Note that the second output matching circuit 32 is not limited to the configuration including one inductor and may be, for example, configured to include a plurality of inductors or configured to include a plurality of inductors and a plurality of capacitors.

(1.1.4) Matching Circuit

The plurality of (four in the illustrated example) matching circuits 71 to 74 correspond one-to-one with the plurality of duplexers 61 to 64. The matching circuit 71 is provided in a signal path between the duplexer 61 and (a selection terminal 551 of) the fifth switch 55 (to be described later). The matching circuit 71 is a circuit for matching an impedance of the duplexer 61 to an impedance of the fifth switch 55. The matching circuit 71 is, for example, configured to include one inductor. Note that the matching circuit 71 is not limited to the configuration including one inductor and may be, for example, configured to include a plurality of inductors or configured to include a plurality of inductors and a plurality of capacitors.

The matching circuit 72 is provided in a signal path between the duplexer 62 and (a selection terminal 552 of) the fifth switch 55. The matching circuit 72 is a circuit for matching an impedance of the duplexer 62 to an impedance of the fifth switch 55. The matching circuit 72 is, for example, configured to include one inductor. Note that the matching circuit 72 is not limited to the configuration including one inductor and may be, for example, configured to include a plurality of inductors or configured to include a plurality of inductors and a plurality of capacitors.

The matching circuit 73 is provided in a signal path between the duplexer 63 and (a selection terminal 554 of) the fifth switch 55. The matching circuit 73 is a circuit for matching an impedance of the duplexer 63 to an impedance of the fifth switch 55. The matching circuit 73 is, for example, configured to include one inductor. Note that the matching circuit 73 is not limited to the configuration including one inductor and may be, for example, configured to include a plurality of inductors or configured to include a plurality of inductors and a plurality of capacitors.

The matching circuit 74 is provided in a signal path between the duplexer 64 and (a selection terminal 555 of) the fifth switch 55. The matching circuit 74 is a circuit for matching an impedance of the duplexer 64 to an impedance of the fifth switch 55. The matching circuit 74 is, for example, configured to include one inductor. Note that the matching circuit 74 is not limited to the configuration including one inductor and may be, for example, configured to include a plurality of inductors or configured to include a plurality of inductors and a plurality of capacitors.

(1.1.5) Low-Noise Amplifier

The first low-noise amplifier 21 is an amplifier which amplifies reception signals in the first communication band and the second communication band with low noise. The first low-noise amplifier 21 is provided in a signal path between the plurality of receiving filters 612 and 622 and a signal output terminal 94 (to be described later). The first low-noise amplifier 21 has a first input terminal (not shown) and a first output terminal (not shown). The first input terminal of the first low-noise amplifier 21 is connected to the first input matching circuit 41. The first output terminal of the first low-noise amplifier 21 is connected to an external circuit (for example, the signal processing circuit 301) via the signal output terminal 94.

The second low-noise amplifier 22 is an amplifier which amplifies reception signals in the third communication band and the fourth communication band with low noise. The second low-noise amplifier 22 is provided in a signal path between the plurality of receiving filters 632 and 642 and a signal output terminal 95 (to be described later). The second low-noise amplifier 22 has a second input terminal (not shown) and a second output terminal (not shown). The second input terminal of the second low-noise amplifier 22 is connected to the second input matching circuit 42. The second output terminal of the second low-noise amplifier 22 is connected to an external circuit (for example, the signal processing circuit 301) via the signal output terminal 95.

(1.1.6) Input Matching Circuit

The first input matching circuit 41 is provided in a signal path between the first low-noise amplifier 21 and a common terminal 530 of the third switch 53 (to be described later). The first input matching circuit 41 is a circuit for matching an impedance of the first low-noise amplifier 21 to impedances of the plurality of receiving filters 612 and 622. The first input matching circuit 41 is, for example, configured to include one inductor. The inductor of the first input matching circuit 41 is provided on an input side of the first low-noise amplifier 21. Note that the first input matching circuit 41 is not limited to the configuration including one inductor and may be, for example, configured to include a plurality of inductors or configured to include a plurality of inductors and a plurality of capacitors.

The second input matching circuit 42 is provided in a signal path between the second low-noise amplifier 22 and a common terminal 540 of the fourth switch 54 (to be described later). The second input matching circuit 42 is a circuit for matching an impedance of the second low-noise amplifier 22 to impedances of the plurality of receiving filters 632 and 642. The second input matching circuit 42 is, for example, configured to include one inductor. The inductor of the second input matching circuit 42 is provided on an input side of the second low-noise amplifier 22. Note that the second input matching circuit 42 is not limited to the configuration including one inductor and may be, for example, configured to include a plurality of inductors or configured to include a plurality of inductors and a plurality of capacitors.

(1.1.7) Switch

The first switch 51 switches a transmitting filter to be connected to the first power amplifier 11 between the plurality of transmitting filters 611 and 621. That is, the first switch 51 is a switch for switching a path to be connected to the first power amplifier 11. The first switch 51 has the common terminal 510 and a plurality of (two in the illustrated example) selection terminals 511 and 512. The common terminal 510 is connected to the first power amplifier 11. The selection terminal 511 is connected to the transmitting filter 611. The selection terminal 512 is connected to the transmitting filter 621.

The first switch 51 switches a state of connection between the common terminal 510 and the plurality of selection terminals 511 and 512. The first switch 51 is controlled by, for example, a controller (not shown). The first switch 51 electrically connects the common terminal 510 and at least one of the plurality of selection terminals 511 and 512 in accordance with a control signal from the controller.

The second switch 52 switches a transmitting filter to be connected to the second power amplifier 12 between the plurality of transmitting filters 631 and 641. That is, the second switch 52 is a switch for switching a path to be connected to the second power amplifier 12. The second switch 52 has the common terminal 520 and a plurality of (two in the illustrated example) selection terminals 521 and 522. The common terminal 520 is connected to the second power amplifier 12. The selection terminal 521 is connected to the transmitting filter 631. The selection terminal 522 is connected to the transmitting filter 641.

The second switch 52 switches a state of connection between the common terminal 520 and the plurality of selection terminals 521 and 522. The second switch 52 is controlled by, for example, a controller. The second switch 52 electrically connects the common terminal 520 and at least one of the plurality of selection terminals 521 and 522 in accordance with a control signal from the controller.

The third switch 53 switches a receiving filter to be connected to the first low-noise amplifier 21 between the plurality of receiving filters 612 and 622. That is, the third switch 53 is a switch for switching a path to be connected to the first low-noise amplifier 21. The third switch 53 has the common terminal 530 and a plurality of (two in the illustrated example) selection terminals 531 and 532. The common terminal 530 is connected to the first low-noise amplifier 21. The selection terminal 531 is connected to the receiving filter 612. The selection terminal 532 is connected to the receiving filter 622.

The third switch 53 switches a state of connection between the common terminal 530 and the plurality of selection terminals 531 and 532. The third switch 53 is controlled by, for example, the signal processing circuit 301. The third switch 53 electrically connects the common terminal 530 and at least one of the plurality of selection terminals 531 and 532 in accordance with a control signal from an RF signal processing circuit 302 of the signal processing circuit 301.

The fourth switch 54 switches a receiving filter to be connected to the second low-noise amplifier 22 between the plurality of receiving filters 632 and 642. That is, the fourth switch 54 is a switch for switching a path to be connected to the second low-noise amplifier 22. The fourth switch 54 has the common terminal 540 and a plurality of (two in the illustrated example) selection terminals 541 and 542. The common terminal 540 is connected to the second low-noise amplifier 22. The selection terminal 541 is connected to the receiving filter 632. The selection terminal 542 is connected to the receiving filter 642.

The fourth switch 54 switches a state of connection between the common terminal 540 and the plurality of selection terminals 541 and 542. The fourth switch 54 is controlled by, for example, the signal processing circuit 301. The fourth switch 54 electrically connects the common terminal 540 and at least one of the plurality of selection terminals 541 and 542 in accordance with a control signal from the RF signal processing circuit 302 of the signal processing circuit 301.

The fifth switch 55 switches a transmitting filter to be connected to an antenna terminal 91 among the plurality of transmitting filters 611, 621, 631, and 641. The fifth switch 55 also switches a receiving filter to be connected to the antenna terminal 91 among the plurality of receiving filters 612, 622, 632, and 642. That is, the fifth switch 55 is a switch for switching a path to be connected to an antenna 310. The fifth switch 55 has a common terminal 550 and a plurality of (six in the illustrated example) selection terminals 551 to 556. The common terminal 550 is connected to the antenna terminal 91. The selection terminal 551 is connected to the transmitting filter 611 and the receiving filter 612. The selection terminal 552 is connected to the transmitting filter 621 and the receiving filter 622. The selection terminal 554 is connected to the transmitting filter 631 and the receiving filter 632. The selection terminal 555 is connected to the transmitting filter 641 and the receiving filter 642. In the example in FIG. 3, no circuits are connected to the selection terminals 553 and 556. Note that although the common terminal 550 is simultaneously connected to the selection terminal 551 and the selection terminal 555 in FIG. 3, a configuration like this in which the common terminal 550 is simultaneously connected to a plurality of selection terminals may be adopted. This configuration makes it possible to support carrier aggregation capable of simultaneously receiving or transmitting signals in different frequency bands.

The fifth switch 55 switches a state of connection between the common terminal 550 and the plurality of selection terminals 551 to 556. The fifth switch 55 is controlled by, for example, the signal processing circuit 301. The fifth switch 55 electrically connects the common terminal 550 and at least one of the plurality of selection terminals 551 to 556 in accordance with a control signal from the RF signal processing circuit 302 of the signal processing circuit 301. In the present embodiment, the fifth switch 55 is an antenna switch (hereinafter also referred to as the "antenna switch 55").

(1.1.8) External Connection Terminal

The plurality of external connection terminals 9 include the antenna terminal 91, the two signal input terminals 92 and 93, the two signal output terminals 94 and 95, a coupling terminal 96, and a plurality of ground terminals (not shown). The plurality of ground terminals are terminals which are electrically connected to a ground electrode of a circuit board (to be described later) of the communication apparatus 300 and are subjected to a ground potential.

The antenna terminal 91 is connected to the antenna 310. Inside the high-frequency module 100, the antenna terminal 91 is connected to (a first connection terminal 871 of) the directional coupler 8. The antenna terminal 91 is also connected to the plurality of transmitting filters 611, 621, 631, and 641 and the plurality of receiving filters 612, 622, 632, and 642 via the directional coupler 8, the filter 601, and the fifth switch 55.

Each of the two signal input terminals 92 and 93 is a terminal for inputting a transmission signal from the external circuit (for example, the signal processing circuit 301) to the high-frequency module 100. Inside the high-frequency module 100, the signal input terminal 92 is connected to the first power amplifier 11. Inside the high-frequency module 100, the signal input terminal 93 is connected to the second power amplifier 12.

The signal output terminal 94 is a terminal for outputting a reception signal from the first low-noise amplifier 21 to the external circuit (for example, the signal processing circuit 301). Inside the high-frequency module 100, the signal output terminal 94 is connected to the first low-noise amplifier 21. The signal output terminal 95 is a terminal for outputting a reception signal from the second low-noise amplifier 22 to the external circuit (for example, the signal processing circuit 301). Inside the high-frequency module 100, the signal output terminal 95 is connected to the second low-noise amplifier 22.

The coupling terminal 96 is a terminal for outputting a signal (detection signal) from the directional coupler 8 to an external device (for example, a detector). The coupling terminal 96 is connected to a third connection terminal 873 (see FIG. 1) of the directional coupler 8.

The plurality of ground terminals are terminals which are electrically connected to a ground electrode of an external board (not shown) of the communication apparatus 300 and are subjected to a ground potential. Inside the high-frequency module 100, the plurality of ground terminals are connected to a ground layer (not shown) of a mounting board 10. The ground layer is a circuit ground of the high-frequency module 100.

(1.2) Configuration of Communication Apparatus

A configuration of the communication apparatus 300 according to the first embodiment will next be described with reference to FIG. 3.

The communication apparatus 300 includes the high-frequency module 100, the antenna 310, and the signal processing circuit 301, as shown in FIG. 3. The communication apparatus 300 further includes a circuit board on which the high-frequency module 100 is mounted. The circuit board is, for example, a printed wiring board. The circuit board has a ground electrode that is subjected to a ground potential.

(1.2.1) Antenna

The antenna 310 is connected to the antenna terminal 91 of the high-frequency module 100. The antenna 310 has a transmission function of emitting a transmission signal output from the high-frequency module 100 as a radio wave and a reception function of receiving a reception signal as a radio wave from the outside and outputting the reception signal to the high-frequency module 100.

(1.2.2) Signal Processing Circuit

The signal processing circuit 301 includes the RF signal processing circuit 302 and a baseband signal processing circuit 303. The signal processing circuit 301 processes a signal passing through the high-frequency module 100. More particularly, the signal processing circuit 301 processes a transmission signal and a reception signal.

The RF signal processing circuit 302 is, for example, a radio frequency integrated circuit (RFIC). The RF signal processing circuit 302 performs signal processing on a high-frequency signal.

The RF signal processing circuit 302 performs signal processing, such as upconversion, on a signal output from the baseband signal processing circuit 303 and outputs a high-frequency signal subjected to the signal processing to the high-frequency module 100. The RF signal processing circuit 302 also performs signal processing, such as down-conversion, on a high-frequency signal output from the high-frequency module 100 and outputs a signal subjected to the signal processing to the baseband signal processing circuit 303.

The baseband signal processing circuit 303 is, for example, a baseband integrated circuit (BBIC). The baseband signal processing circuit 303 performs predetermined signal processing on a transmission signal from outside the signal processing circuit 301. A reception signal processed in the baseband signal processing circuit 303 is used as an image signal for image display as the image signal or is used as a voice signal for a call, for example.

The RF signal processing circuit 302 also has a function of a control unit which controls connection in each of the third switch 53, the fourth switch 54, the fifth switch 55, the first selector switch 84, the short-circuiting switch 85, and a second selector switch 86 of the high-frequency module 100 on the basis of transmission and reception of a high-frequency signal (a transmission signal or a reception signal). Specifically, the RF signal processing circuit 302 switches connection in each of the third switch 53, the fourth switch 54, the fifth switch 55, the first selector switch 84, the short-circuiting switch 85, and the second selector switch 86 of the high-frequency module 100 by a control signal (not shown). Note that the control unit may be provided outside the RF signal processing circuit 302 and may be provided in, for example, the high-frequency module 100 or the baseband signal processing circuit 303.

(1.3) Configuration of Directional Coupler

A configuration of the directional coupler 8 according to the first embodiment will next be described with reference to FIGS. 1 and 2.

The directional coupler 8 includes the main line 81, a plurality of (two in the illustrated example) sub-lines 82, the termination circuit 83, the first selector switch 84, the short-circuiting switch 85, and the second selector switch 86, as shown in FIGS. 1 and 2. The directional coupler 8 further includes a plurality of (three in the illustrated example) connection terminals 87. The plurality of sub-lines 82 include the first sub-line 821 and the second sub-line 822. The plurality of connection terminals 87 include the first connection terminal 871, a second connection terminal 872, and the third connection terminal (1.3.1) Main Line The main line 81 has a first end 811 and a second end 812 which are both ends in a longitudinal direction of the main line 81. The first end 811 of the main line 81 is connected to the first connection terminal 871. The first end 811 of the main line 81 is also connected to the antenna terminal 91 (see FIG. 3) via the first connection terminal 871. The second end 812 of the main line 81 is connected to the second connection terminal 872. The second end 812 of the main line 81 is connected to the diplexer 60 (see FIG. 3) via the second connection terminal 872.

(1.3.2) Sub-Line

The first sub-line 821 has a first end 8211 and a second end 8212 which are both ends in a longitudinal direction of the first sub-line 821. The first end 8211 of the first sub-line 821 is connected to the second selector switch 86 (to be described later). More particularly, the first end 8211 of the first sub-line 821 is connected to a common terminal 860 of the second selector switch 86. The second end 8212 of the first sub-line 821 is connected to the third connection terminal 873. The second end 8212 of the first sub-line 821 is connected to the coupling terminal 96 (see FIG. 3) via the third connection terminal 873. The first sub-line 821 is electromagnetically coupled to the main line 81.

The second sub-line 822 has a first end 8221 and a second end 8222 which are both ends in a longitudinal direction of the second sub-line 822. The first end 8221 of the second sub-line 822 is connected to the first selector switch 84 (to be described later). More particularly, the first end 8221 of the second sub-line 822 is connected to a selection terminal 842 of the first selector switch 84. The second end 8222 of the second sub-line 822 is connected to the second selector switch 86. More particularly, the second end 8222 of the second sub-line 822 is connected to a selection terminal 862 of the second selector switch 86. The second sub-line 822 is electromagnetically coupled to the main line 81, like the first sub-line 821.

The first sub-line 821 and the second sub-line 822 are lined up along the longitudinal direction (a lateral direction in FIG. 1) of the main line 81, as shown in FIGS. 1 and 2. A length L1 of the first sub-line 821 and a length L2 of the second sub-line 822 are the same. Note that the length L1 of the first sub-line 821 and the length L2 of the second sub-line 822 may be different. That is, the length L2 of the second sub-line 822 may be longer or shorter than the length L1 of the first sub-line 821.

(1.3.3) Termination Circuit

The termination circuit 83 is a circuit for terminating at least one of the first sub-line 821 and the second sub-line 822 described above. More particularly, the termination circuit 83 terminates the first sub-line 821 in the first mode. The termination circuit 83 also terminates the first sub-line 821 and the second sub-line 822 that are series-connected in the second mode. The termination circuit 83 has, for example, a variable resistor 831 and a variable capacitor 832, as shown in FIGS. 1 and 2. The variable resistor 831 is connected between a common terminal 840 of the first selector switch 84 and a ground. The variable capacitor 832 is connected in parallel with the variable resistor 831. That is, the variable capacitor 832 is also connected between the common terminal 840 of the first selector switch 84 and the ground.

(1.3.4) First Selector Switch

The first selector switch 84 is a switch for switching a connection destination of the first sub-line 821. The first selector switch 84 has the common terminal 840 and a plurality of (two in the illustrated example) selection terminals 841 and 842. The common terminal 840 is connected to the termination circuit 83. The selection terminal 841 is connected to a selection terminal 861 of the second selector switch 86. The selection terminal 842 is connected to the first end 8221 of the second sub-line 822.

The first selector switch 84 switches between a first state of connecting the common terminal 840 and the selection terminal 841 and a second state of connecting the common terminal 840 and the selection terminal 842. More particularly, the first selector switch 84 connects the common terminal 840 and the selection terminal 841 in the first mode and connects the common terminal 840 and the selection terminal 842 in the second mode. For this reason, the first sub-line 821 and the termination circuit 83 are connected in the first mode, and the second sub-line 822 and the termination circuit 83 are connected in the second mode. The first selector switch 84 is controlled by, for example, the signal processing circuit 301. The first selector switch 84 connects the common terminal 840 to either one of the plurality of selection terminals 841 and 842 in accordance with a control signal from the RF signal processing circuit 302 of the signal processing circuit 301.

In the present embodiment, the first selector switch 84 is a selector switch. In the present embodiment, the common terminal 840 is a first terminal, the selection terminal 841 is a second terminal, and the selection terminal 842 is a third terminal.

(1.3.5) Short-Circuiting Switch

The short-circuiting switch 85 is a switch for short-circuiting the both ends of the second sub-line 822. The short-circuiting switch 85 has a plurality of (two in the illustrated example) terminals 851 and 852. The terminal 851 is connected to the first end 8221 of the second sub-line 822. The terminal 852 is connected to the second end 8222 of the second sub-line 822. That is, the short-circuiting switch 85 is connected between the both ends of the second sub-line 822.

The short-circuiting switch 85 switches between a first state of connecting the terminal 851 and the terminal 852 and a second state of disconnecting the terminal 851 and the terminal 852 from each other. More particularly, the short-circuiting switch 85 connects the terminal 851 and the terminal 852 in the first mode and disconnects the terminal 851 and the terminal 852 from each other in the second mode. For this reason, the both ends (the first end 8221 and the second end 8222) of the second sub-line 822 are short-circuited in the first mode. The short-circuiting switch 85 is controlled by, for example, the signal processing circuit 301. The short-circuiting switch 85 connects the terminal 851 to the terminal 852 or disconnects the terminal 851 from the terminal 852 in accordance with a control signal from the RF signal processing circuit 302 of the signal processing circuit 301.

(1.3.6) Second Selector Switch

The second selector switch 86 is a switch for switching between the first mode of using only the first sub-line 821 as a sub-line and the second mode of using the first sub-line 821 and the second sub-line 822. The second selector switch 86 has the common terminal 860 and the plurality of (two in the illustrated example) selection terminals 861 and 862. The common terminal 860 is connected to the first end 8211 of the first sub-line 821. The selection terminal 861 is connected to the selection terminal 841 of the first selector switch 84. The selection terminal 862 is connected to the second end 8222 of the second sub-line 822.

The second selector switch 86 switches between a first state of connecting the common terminal 860 and the selection terminal 861 and a second state of connecting the common terminal 860 and the selection terminal 862. More particularly, the second selector switch 86 connects the common terminal 860 and the selection terminal 861 in the first mode and connects the common terminal 860 and the selection terminal 862 in the second mode. For this reason, the first sub-line 821 and the termination circuit 83 are connected in the first mode, and the second sub-line 822 and the termination circuit 83 are connected in the second mode. The second selector switch 86 is controlled by, for example, the signal processing circuit 301. The second selector switch 86 connects the common terminal 860 to either one of the plurality of selection terminals 861 and 862 in accordance with a control signal from the RF signal processing circuit 302 of the signal processing circuit 301.

In the present embodiment, the common terminal 860 is a fourth terminal, the selection terminal 861 is a fifth terminal, and the selection terminal 862 is a sixth terminal.

(2) Structure of High-Frequency Module

A structure of the high-frequency module 100 will next be described with reference to FIGS. 4 to 6.

Figure 4:
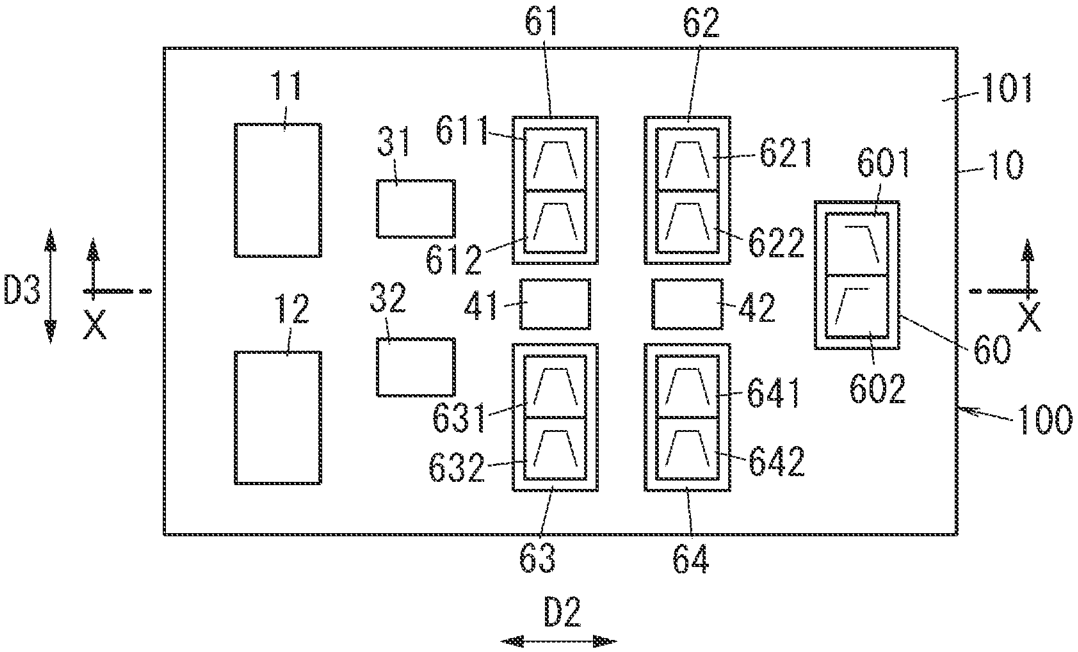
FIG. 4 is a plan view of the high-frequency module.
Figure 5:
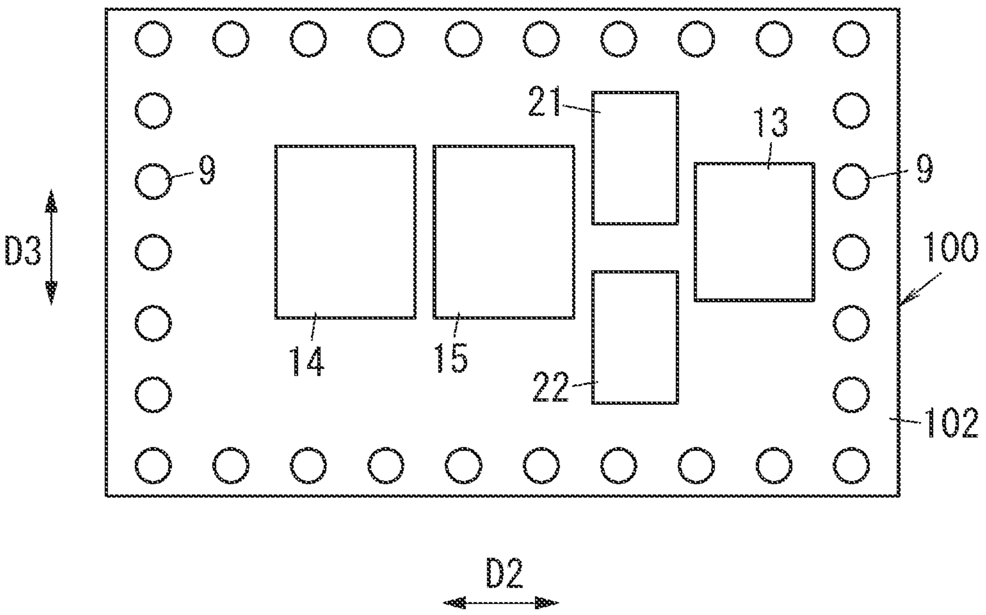
FIG. 5 relates to the high-frequency module and is a plan view of a second principal surface of a mounting board and electronic components and a plurality of external connection terminals arranged at the second principal surface of the mounting board as seen through from a first principal surface side of the mounting board.
Figure 6:
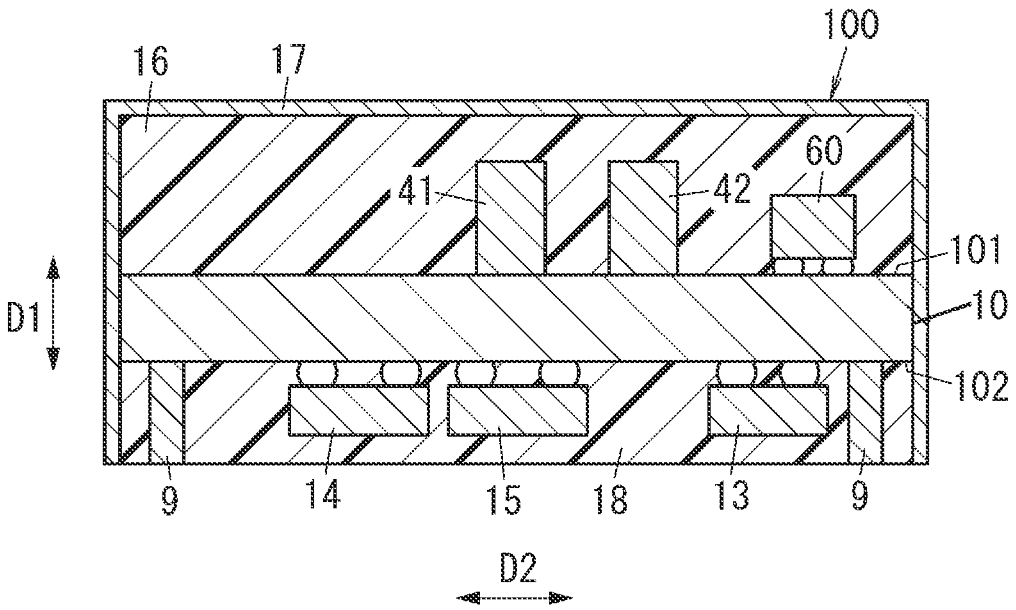
FIG. 6 relates to the high-frequency module and is a sectional view taken along line X-X in FIG. 4.

The high-frequency module 100 includes the mounting board 10, a plurality of electronic components, and the plurality of external connection terminals 9, as shown in FIGS. 4 to 6. The high-frequency module 100 further includes a first resin layer 16, a second resin layer 18, and a metal electrode layer 17.

The high-frequency module 100 can be electrically connected to the external board (not shown). The external board corresponds to, for example, a motherboard of the communication apparatus 300, such as a mobile phone or communication equipment. Note that the statement that the high-frequency module 100 can be electrically connected to the external board includes not only a case where the high-frequency module 100 is directly mounted on the external board but also a case where the high-frequency module 100 is indirectly mounted on the external board. The case where the high-frequency module 100 is indirectly mounted on the external board is, for example, a case where the high-frequency module 100 is mounted on a different high-frequency module which is mounted on the external board.

(2.1) Mounting Board

The mounting board 10 has a first principal surface 101 and a second principal surface 102, as shown in FIGS. 4 to 6. The first principal surface 101 and the second principal surface 102 face each other in a thickness direction D1 of the mounting board 10. The second principal surface 102 faces a principal surface on the mounting board 10 side of the external board when the high-frequency module 100 is provided on the external board. The mounting board 10 is a double-sided mounting board in which the plurality of electronic components are mounted on the first principal surface 101 and the second principal surface 102.

The mounting board 10 is a multilayer board in which a plurality of dielectric layers are stacked. The mounting board 10 has a plurality of conductive layers and a plurality of via conductors (including through-electrodes). The plurality of conductive layers include the ground layer at the ground potential. The plurality of via conductors are used for electrical connection between elements arranged at each of the first principal surface 101 and the second principal surface 102 and the conductive layers of the mounting board 10. The plurality of via conductors are also used for electrical connection between elements arranged at the first principal surface 101 and elements arranged at the second principal surface 102 and electrical connection between the conductive layers of the mounting board 10 and the external connection terminals 9.

In the high-frequency module 100 according to the first embodiment, electronic components in a first group of the plurality of electronic components are arranged at the first principal surface 101 of the mounting board 10. The electronic components in the first group include the first power amplifier 11, the second power amplifier 12, the plurality of filter devices 60 to 64, the first output matching circuit 31, the second output matching circuit 32, the first input matching circuit 41, and the second input matching circuit 42.

In the high-frequency module 100, electronic components in a second group of the plurality of electronic components are arranged at the second principal surface 102 of the mounting board 10. The electronic components in the second group include a first IC chip 13, a second IC chip 14, a third IC chip 15, the first low-noise amplifier 21, and the second low-noise amplifier 22. The first IC chip 13 is an IC chip (IC component) including the fifth switch (antenna switch) 55, the first selector switch 84, the short-circuiting switch 85, and the second selector switch 86. That is, the fifth switch 55 is integral with the first selector switch 84 and the short-circuiting switch 85. The second IC chip 14 is an IC chip including the first switch 51 and the second switch 52. The third IC chip 15 is an IC chip including the third switch 53 and the fourth switch 54.

Note that although the matching circuits 71 to 74 and the termination circuit 83 are not shown in any of FIGS. 4 to 6, the matching circuits 71 to 74 and the termination circuit 83 may be arranged at either one of the first principal surface 101 and the second principal surface 102 of the mounting board 10. The main line 81, the first sub-line 821, and the second sub-line 822 of the directional coupler 8 are provided inside the mounting board (multilayer board) 10, as will be described later.

(2.2) Electronic Component

The plurality of electronic components include the electronic components in the first group and the electronic components in the second group, as described above. The electronic components in the first group are arranged at the first principal surface 101 of the mounting board 10. The electronic components in the first group include a plurality of first electronic components constituting the plurality of filter devices 60 to 64, a plurality of second electronic components constituting the first power amplifier 11 and the second power amplifier 12, and a plurality of third electronic components constituting the first output matching circuit 31, the second output matching circuit 32, the first input matching circuit 41, and the second input matching circuit 42.

Each of the filters 601 and 602 constituting the diplexer 60 and the plurality of transmitting filters 611, 621, 631, and 641 and the plurality of receiving filters 612, 622, 632, and 642 constituting the plurality of duplexers 61 to 64 is, for example, an acoustic wave filter including a plurality of series arm resonators and a plurality of parallel arm resonators. The acoustic wave filter is, for example, a surface acoustic wave (SAW) filter using surface acoustic waves. Additionally, each of the plurality of filters 601 and 602, the plurality of transmitting filters 611, 621, 631, and 641, and the plurality of receiving filters 612, 622, 632, and 642 may include at least one of an inductor and a capacitor which is series-connected to any of the plurality of series arm resonators or may include an inductor or a capacitor which is series-connected to any of the plurality of parallel arm resonators.

The electronic components in the second group are arranged at the second principal surface 102 of the mounting board 10. The electronic components in the second group include a plurality of fourth electronic components constituting the first IC chip 13, the second IC chip 14, and the third IC chip 15 and a plurality of fifth electronic components constituting the first low-noise amplifier 21 and the second low-noise amplifier 22.

(2.3) External Connection Terminal

The plurality of external connection terminals 9 are terminals for electrically connecting the mounting board 10 and the external board (not shown).

The plurality of external connection terminals 9 are arranged at the second principal surface 102 of the mounting board 10, as shown in FIGS. 5 and 6. The statement that "the external connection terminal 9 is arranged at the second principal surface 102 of the mounting board 10" includes a case where the external connection terminal 9 is mechanically connected to the second principal surface 102 of the mounting board 10 and a case where the external connection terminal 9 is electrically connected to (an appropriate conductor portion of) the mounting board 10. A material for the plurality of external connection terminals 9 is, for example, metal (for example, copper or a copper alloy). Each of the plurality of external connection terminals 9 is a columnar electrode. Although the columnar electrode is joined to, for example, the conductor portion of the mounting board 10 with, for example, solder, the columnar electrode is not necessarily joined by solder. For example, the columnar electrode may be joined using conductive adhesive (for example, conductive paste) or may be directly joined. Each of the plurality of external connection terminals 9 is circular-shaped in plan view from the thickness direction D1 of the mounting board 10.

(2.4) Resin Layer

The first resin layer 16 is arranged at the first principal surface 101 of the mounting board 10, as shown in FIG. 6. The first resin layer 16 covers the electronic components in the first group arranged at the first principal surface 101 of the mounting board 10. The first resin layer 16 contains resin (for example, epoxy resin). The first resin layer 16 may contain a filler in addition to the resin.

The second resin layer 18 is arranged at the second principal surface 102 of the mounting board 10, as shown in FIG. 6. The second resin layer 18 covers the electronic components in the second group and the plurality of external connection terminals 9 arranged at the second principal surface 102 of the mounting board 10. The second resin layer 18 contains resin (for example, epoxy resin). The second resin layer 18 may contain a filler in addition to the resin. A material for the second resin layer 18 may be the same material as a material for the first resin layer 16 or a different material.

(2.5) Metal Electrode Layer

The metal electrode layer 17 has conductivity. The metal electrode layer 17 is provided with the purpose of electromagnetically shielding an inside and an outside of the high-frequency module 100. The metal electrode layer 17 has a multilayer structure having a plurality of metal layers stacked. The metal electrode layer 17, however, is not limited to the multilayer structure and may be one metal layer. The one metal layer contains one or a plurality of types of metals. The metal electrode layer 17 covers a principal surface on a side opposite to the mounting board 10 side of the first resin layer 16, an outer peripheral surface of the first resin layer 16, an outer peripheral surface of the mounting board 10, and an outer peripheral surface of the second resin layer 18, as shown in FIG. 6. The metal electrode layer 17 is in contact with at least a part of an outer peripheral surface of the ground layer (not shown) of the mounting board 10. With this configuration, a potential of the metal electrode layer 17 can be equalized with the potential of the ground layer.

(3) Detailed Structure of Each Constituent Element of High-Frequency Module (3.1) Mounting Board The mounting board 10 is, for example, a multilayer board including the plurality of dielectric layers and the plurality of conductive layers. The plurality of dielectric layers and the plurality of conductive layers are stacked in the thickness direction D1 of the mounting board 10. The plurality of conductive layers are formed to have predetermined patterns defined for the respective layers. Each of the plurality of conductive layers includes one or a plurality of conductor portions in one plane orthogonal to the thickness direction D1 of the mounting board 10. A material for each conductive layer is, for example, copper. The plurality of conductive layers include the ground layer (not shown). In the high-frequency module 100, the plurality of ground terminals and the ground layer are electrically connected via the via conductors and the like of the mounting board 10. The mounting board 10 is, for example, a low temperature co-fired ceramics (LTCC) board. The mounting board 10 is not limited to the LTCC board and may be, for example, a printed wiring board, a high temperature co-fired ceramics (HTCC) board, or a resin multilayer board.

The mounting board 10 is not limited to the LTCC board and may be, for example, a wiring structure. The wiring structure is, for example, a multilayer structure. The multilayer structure includes at least one insulating layer and at least one conductive layer. The insulating layer is formed to have a predetermined pattern. If there are a plurality of insulating layers, the plurality of insulating layers are formed to have predetermined patterns defined for the respective layers. The conductive layer is formed to have a predetermined pattern different from the predetermined pattern of the insulating layer. If there are a plurality of conductive layers, the plurality of conductive layers are formed to have predetermined patterns defined for the respective layers. The conductive layer may include one or a plurality of rewiring portions. In the case of the wiring structure, of two surfaces facing each other in a thickness direction of the multilayer structure, a first surface is the first principal surface 101 of the mounting board 10, and a second surface is the second principal surface 102 of the mounting board 10. The wiring structure may be, for example, an interposer. The interposer may be an interposer using a silicon substrate or may be a board composed of multiple layers.

The first principal surface 101 and the second principal surface 102 of the mounting board 10 are separated from each other in the thickness direction D1 of the mounting board 10 and intersect the thickness direction D1 of the mounting board 10. Although the first principal surface 101 in the mounting board 10 is, for example, orthogonal to the thickness direction D1 of the mounting board 10, the first principal surface 101 may include, for example, a side surface or the like of a conductor portion as a surface not orthogonal to the thickness direction D1 of the mounting board 10. Although the second principal surface 102 in the mounting board 10 is, for example, orthogonal to the thickness direction D1 of the mounting board 10, the second principal surface 102 may include, for example, a side surface or the like of a conductor portion as a surface not orthogonal to the thickness direction D1 of the mounting board 10. Alternatively, microscopic asperities, depressions, or projections may be formed at the first principal surface 101 and the second principal surface 102 of the mounting board 10.

(3.2) Filter Device

A detailed structure of the plurality of filter devices 60 to 64 will be described. The plurality of filter devices 60 to 64 will be referred to as filters below without necessarily any distinction.

A filter composed of a first electronic component is a bare-chip acoustic wave filter. The first electronic component has a substrate, a circuit portion, a plurality of pad electrodes, a piezoelectric layer, and a low-acoustic-velocity film. The substrate has a first surface and a second surface facing each other in a thickness direction of the substrate. The circuit portion includes a plurality of interdigital transducer (IDT) electrodes. The plurality of pad electrodes are formed above the first surface of the substrate and are connected to the circuit portion. The plurality of pad electrodes are connected to the mounting board 10 via a plurality of bumps. The low-acoustic-velocity film is provided on the first surface of the substrate. The piezoelectric layer is provided on the low-acoustic-velocity film. The plurality of IDT electrodes are provided on the piezoelectric layer. The plurality of IDT electrodes are arranged in a space formed between the substrate and the mounting board 10 by the plurality of pad electrodes, the plurality of bumps, the substrate, the mounting board 10, and the first resin layer 16. Although the first electronic component is rectangular-shaped in plan view from the thickness direction of the substrate, the first electronic component may be, for example, square-shaped.

The low-acoustic-velocity film is located away from an outer periphery of the substrate in plan view from the thickness direction of the substrate. The first electrode component further has an insulating layer. The insulating layer covers a region which is not covered with the low-acoustic-velocity film of the first surface of the substrate. The insulating layer has electrical insulation. The insulating layer is formed along the outer periphery of the substrate on the first surface of the substrate. The insulating layer surrounds the plurality of IDT electrodes. The insulating layer is frame-shaped (for example, rectangular frame-shaped) in plan view from a thickness direction of the first electronic component. A part of the insulating layer overlaps with an outer peripheral portion of the piezoelectric layer in the thickness direction of the first electronic component. An outer peripheral surface of the piezoelectric layer and an outer peripheral surface of the low-acoustic-velocity film are covered with the insulating layer. A material for the insulating layer is epoxy resin, polyimide, or the like.

The plurality of pad electrodes are provided above the first surface of the substrate with the insulating layer interposed therebetween.

A material for the piezoelectric layer is, for example, lithium niobate or lithium tantalate. A material for the low-acoustic-velocity film is, for example, silicon oxide. In the low-acoustic-velocity film, an acoustic velocity of a bulk wave which propagates through the low-acoustic-velocity film is lower than an acoustic velocity of a bulk wave which propagates through the piezoelectric layer. The material for the low-acoustic-velocity film is not limited to silicon oxide and may be, for example, silicon oxide, glass, silicon oxynitride, tantalum oxide, a compound obtained by adding fluorine, carbon, or boron to silicon oxide, or a material having each of the above-described materials as a main ingredient.

The substrate is, for example, a silicon substrate. That is, a material for the substrate of the first electronic component is silicon. In the substrate, an acoustic velocity of a bulk wave which propagates through the substrate is higher than an acoustic velocity of an acoustic wave which propagates through the piezoelectric layer. The bulk wave that propagates through the substrate here is a bulk wave having a lowest acoustic velocity among a plurality of bulk waves propagating through the substrate. In the present embodiment, a high-acoustic-velocity member is composed of the substrate and the low-acoustic-velocity film provided on the substrate. In the present embodiment, the substrate is a support substrate composed of a silicon substrate. Note that the material for the substrate is not limited to silicon and may be, for example, a material having, as a main ingredient, any of gallium arsenide, aluminum arsenide, indium arsenide, indium phosphide, gallium phosphide, indium antimonide, gallium nitride, indium nitride, aluminum nitride, silicon, germanium, silicon carbide, and gallium(III) oxide or a multicomponent mixed crystal material made up of two or more materials of the above-described materials.

The first electronic component may further have a high-acoustic-velocity film which is provided between the substrate and the low-acoustic-velocity film. In the high-acoustic-velocity film, an acoustic velocity of a bulk wave which propagates through the high-acoustic-velocity film is higher than the acoustic velocity of an acoustic wave which propagates through the piezoelectric layer. A material for the high-acoustic-velocity film is, for example, silicon nitride. The material for the high-acoustic-velocity film is not limited to silicon oxide, and the high-acoustic-velocity film may be made of, for example, at least one material selected from the group consisting of diamond-like carbon, aluminum nitride, aluminum oxide, silicon carbide, silicon nitride, silicon, sapphire, lithium tantalate, lithium niobate, crystal, zirconia, cordierite, mullite, steatite, forsterite, magnesia, and diamond.

The first electronic component may include, for example, an adhesion layer intervening between the low-acoustic-velocity film and the piezoelectric layer. The adhesion layer is made of, for example, resin (epoxy resin or polyimide resin). The first electronic component may include a dielectric film between the low-acoustic-velocity film and the piezoelectric layer, on the piezoelectric layer, or underneath the low-acoustic-velocity film.

(3.3) Power Amplifier

Each of the plurality of second electronic components is an IC chip constituting the first power amplifier 11 or the second power amplifier 12. Each of the plurality of second electronic components includes a substrate and a circuit portion. The substrate has a first surface and a second surface facing each other in a thickness direction of the substrate. The substrate is, for example, a gallium arsenide substrate. That is, a material for the substrate of the second electronic component is gallium arsenide. The circuit portion includes at least one transistor which is formed at the first surface of the substrate. The circuit portion has a function of amplifying a transmission signal input to the first power amplifier 11 or the second power amplifier 12. The transistor is, for example, a heterojunction bipolar transistor (HBT). Each of the first power amplifier 11 and the second power amplifier 12 may include, for example, a capacitor for cutting direct current. Each of the plurality of second electronic components is flip-chip mounted on the first principal surface 101 of the mounting board 10, for example, such that the first surface of the substrate faces the first principal surface 101 side of the mounting board 10. An outer edge of each of the plurality of second electronic components is quadrangular-shaped in plan view from the thickness direction D1 of the mounting board 10.

Note that the material for the substrate is not limited to gallium arsenide and may be, for example, a material having, as a main ingredient, any of gallium arsenide, aluminum arsenide, indium arsenide, indium phosphide, gallium phosphide, indium antimonide, gallium nitride, indium nitride, aluminum nitride, silicon, germanium, silicon-germanium, silicon carbide, gallium(III) oxide, and gallium-bismuth or a multicomponent mixed crystal material made up of two or more materials of the above-described materials.

(3.4) Matching Circuit

Each of the plurality of third electronic components is, for example, a chip component constituting an inductor or a capacitor of the first output matching circuit 31, the second output matching circuit 32, the first input matching circuit 41, or the second input matching circuit 42. Each of the plurality of third electronic components is a surface mount device (SMD). Each of the plurality of third electronic components is rectangular parallelepiped-shaped. An outer edge of each of the plurality of third electronic components is quadrangular-shaped in plan view from the thickness direction D1 of the mounting board 10.

(3.5) IC Chip

Each of the plurality of fourth electronic components is a chip component constituting the first IC chip 13, the second IC chip 14, or the third IC chip 15. Each of the plurality of fourth electronic components includes a substrate and a circuit portion. The substrate has a first surface and a second surface facing each other. The substrate is, for example, a silicon substrate. The circuit portion includes a plurality of FETs as a plurality of switching elements. Each of the plurality of switching elements is not limited to an FET and may be, for example, a bipolar transistor. Each of the plurality of fourth electrode components is flip-chip mounted on the second principal surface 102 of the mounting board 10 such that the first surface of the substrate faces the second principal surface 102 side of the mounting board 10. An outer edge of each of the plurality of fourth electrode components is quadrangular-shaped in plan view from the thickness direction D1 of the mounting board 10.

The fourth electronic component constituting the first IC chip 13 has, as the above-described FETs, a first FET constituting the short-circuiting switch 85, a second FET constituting the first selector switch 84, and a third FET constituting the second selector switch 86. That is, the short-circuiting switch 85 includes the first FET, the first selector switch 84 includes the second FET, and the second selector switch 86 includes the third FET. A gate width of the first FET is wider than a gate width of the second FET and is wider than a gate width of the third FET. For this reason, a resistance of a closed circuit including the second sub-line 822 can be reduced, and the degree of coupling between the main line 81 and the second sub-line 822 can be weakened. As a result, it is possible to reduce leakage of a signal from the main line 81 to the second sub-line 822 and reduce loss of a signal passing through the main line 81.

(3.6) Low-Noise Amplifier

Each of the plurality of fifth electronic components is an IC chip constituting the first low-noise amplifier 21 or the second low-noise amplifier 22. Each of the plurality of fifth electronic components includes a substrate and a circuit portion. The substrate has a first surface and a second surface facing each other. The substrate is, for example, a silicon substrate. The circuit portion is formed at the first surface of the substrate. The circuit portion has a function of amplifying a reception signal input to the first low-noise amplifier 21 or the second low-noise amplifier 22. Each of the plurality of fifth electronic components is flip-chip mounted on the second principal surface 102 of the mounting board 10, for example, such that the first surface of the substrate faces the second principal surface 102 side of the mounting board 10. An outer edge of each of the plurality of fifth electronic components is quadrangular-shaped in plan view from the thickness direction D1 of the mounting board 10.

(4) Layout of High-Frequency Module

A layout of the high-frequency module 100 will next be described with reference to FIGS. 4 and 5.

The two duplexers 61 and 63 of the plurality of duplexers 61 to 64 are lined up along a transverse direction D3 of the mounting board 10 on the first principal surface 101 of the mounting board 10. The two duplexers 62 and 64 of the plurality of duplexers 61 to 64 are lined up along the transverse direction D3 of the mounting board 10 on the first principal surface 101 of the mounting board 10. The two duplexers 61 and 63 and the two duplexers 62 and 64 are lined up along a longitudinal direction D2 of the mounting board 10. On the first principal surface 101 of the mounting board 10, the diplexer 60 is arranged on the opposite side of the two duplexers 62 and 64 from the two duplexers 61 and 63. On the first principal surface 101 of the mounting board 10, the first input matching circuit 41 is arranged between the two duplexers 61 and 63, and the second input matching circuit 42 is arranged between the two duplexers 62 and 64.

Additionally, on the first principal surface 101 of the mounting board 10, the first power amplifier 11 and the second power amplifier 12 are arranged on the opposite side of the two duplexers 61 and 63 from the two duplexers 62 and 64. The first power amplifier 11 and the second power amplifier 12 are lined up along the transverse direction D3 of the mounting board 10. On the first principal surface 101 of the mounting board 10, the first output matching circuit 31 and the second output matching circuit 32 are arranged between the first and second power amplifiers 11 and 12 and the two duplexers 61 and 63. The first output matching circuit 31 and the second output matching circuit 32 are lined up along the transverse direction D3 of the mounting board 10.

The first IC chip 13, the second IC chip 14, and the third IC chip 15 are lined up along the longitudinal direction D2 of the mounting board 10 on the second principal surface 102 of the mounting board 10. More particularly, the first IC chip 13, the second IC chip 14, and the third IC chip 15 are lined up in the order of the second IC chip 14, the third IC chip 15, the first IC chip 13 from one end side (a left side in FIG. 5) in the longitudinal direction D2 of the mounting board 10. In the longitudinal direction D2 of the mounting board 10, the first low-noise amplifier 21 and the second low-noise amplifier 22 are arranged between the first IC chip 13 and the third IC chip 15. The first low-noise amplifier 21 and the second low-noise amplifier 22 are lined up along the transverse direction D3 of the mounting board 10.

(5) Operation of Directional Coupler

Operation of the directional coupler 8 according to the first embodiment will next be described with reference to FIGS. 1 and 2.

The directional coupler 8 has the first mode and the second mode, as described above. The first mode is a mode of detecting a signal in the first frequency band of signals transmitted through the main line 81. The second mode is a mode of detecting a signal in the second frequency band of signals transmitted through the main line 81.

(5.1) First Mode

The directional coupler 8 connects the common terminal 840 and the selection terminal 841 of the first selector switch 84 and connects the common terminal 860 and the selection terminal 861 of the second selector switch 86 in the first mode, as shown in FIG. 1. The directional coupler 8 also connects the terminal 851 and the terminal 852 of the short-circuiting switch 85 in the first mode. For this reason, in the first mode, the first sub-line 821 and the termination circuit 83 are connected, and the both ends (the first end 8221 and the second end 8222) of the second sub-line 822 are short-circuited.

In the first mode, the directional coupler 8 detects a signal in the first frequency band of signals (transmission signals or reception signals) transmitted through the main line 81 in the first sub-line 821 and outputs an obtained detection signal to the external device (for example, a detector) via the third connection terminal 873 and the coupling terminal 96 (see FIG. 3).

In the first mode, as described above, the both ends of the second sub-line 822 are short-circuited, and a closed circuit including the second sub-line 822 is formed. For this reason, an electromagnetic field appearing around the second sub-line 822 can be inhibited from spreading, and the degree of coupling between the main line 81 and the second sub-line 822 can be weakened. As a result, it is possible to reduce leakage of a signal from the main line 81 to the second sub-line 822 and reduce loss of a signal transmitted through the main line 81.

(5.2) Second Mode

The directional coupler 8 connects the common terminal 840 and the selection terminal 842 of the first selector switch 84 and connects the common terminal 860 and the selection terminal 862 of the second selector switch 86 in the second mode, as shown in FIG. 2. The directional coupler 8 also disconnects the terminal 851 and the terminal 852 of the short-circuiting switch 85 from each other in the second mode. For this reason, the first sub-line 821 and the second sub-line 822 that are series-connected and the termination circuit 83 are connected in the second mode.

For the above-described reason, a length (L1+L2) of a sub-line to be connected to the termination circuit 83 can be made longer than in the first mode of connecting only the first sub-line 821 to the termination circuit 83, and a signal in the second frequency band that is a lower frequency band than in the first mode can be detected. The directional coupler 8 outputs a detection signal detected in the second mode to the external device (for example, a detector) via the third connection terminal 873 and the coupling terminal 96 (see FIG. 3).

(6) Effects (6.1) Directional Coupler

In the directional coupler 8 according to the first embodiment, as described above, the both ends (the first end 8221 and the second end 8222) of the second sub-line 822 are short-circuited by the short-circuiting switch 85 in the first mode of connecting only the first sub-line 821 to the termination circuit 83, and a closed circuit including the second sub-line 822 can be formed. For this reason, an electromagnetic field appearing around the second sub-line 822 can be inhibited from spreading, and the degree of coupling between the main line 81 and the second sub-line 822 can be weakened. As a result, it is possible to reduce leakage of a signal from the main line 81 to the second sub-line 822 and reduce loss of a signal transmitted through the main line 81.

In the directional coupler 8 according to the first embodiment, a sub-line in the second mode can be formed from the first sub-line 821 and the second sub-line 822 that are series-connected, as described above. For this reason, the size of the directional coupler 8 can be made smaller than in a case where a sub-line in the second mode is formed from one sub-line.

In the directional coupler 8 according to the first embodiment, the gate width of the first FET constituting the short-circuiting switch 85 is wider than the gate width of the second FET constituting the first selector switch 84 and is wider than the gate width of the third FET of the second selector switch 86, as described above. For this reason, a resistance of the closed circuit including the second sub-line 822 can be reduced, and the degree of coupling between the main line 81 and the second sub-line 822 can be weakened. As a result, it is possible to reduce leakage of a signal from the main line 81 to the second sub-line 822 and reduce loss of a signal transmitted through the main line 81.

(6.2) High-Frequency Module and Communication Apparatus

Since the high-frequency module 100 and the communication apparatus 300 according to the first embodiment include the directional coupler 8, as described above, loss of a signal transmitted through the main line 81 of the directional coupler 8 can be reduced.

In the high-frequency module 100 according to the first embodiment, the fifth switch (antenna switch) 55 is included in the first IC chip 13 together with the first selector switch 84 and the short-circuiting switch 85 and is integral with the first selector switch 84 and the short-circuiting switch 85, as described above. For this reason, the size of the high-frequency module 100 can be made smaller than in a case where the fifth switch 55 and a combination of the first selector switch 84 and the short-circuiting switch 85 are included in separate IC chips.

Note that a plurality of electronic components constituting the signal processing circuit 301 described above may be mounted on, for example, the above-described circuit board or may be mounted on a circuit board (second circuit board) different from the circuit board (first circuit board), on which the high-frequency module 100 is mounted. That is, a circuit board on which the signal processing circuit 301 is to be mounted and a circuit board on which the high-frequency module 100 is to be mounted may be different circuit boards.

(7) Modification

A high-frequency module 100a according to a modification of the first embodiment will be described with reference to FIGS. 7 and 8. As for the high-frequency module 100a according to the modification, same constituent elements as those of the high-frequency module 100 according to the first embodiment are denoted by same reference characters, and a description thereof will be omitted.

The high-frequency module 100a according to the modification is different from the high-frequency module 100 according to the first embodiment in that the first IC chip 13 including the fifth switch (antenna switch) 55, the first selector switch 84, the short-circuiting switch 85, and the second selector switch 86 is arranged at the first principal surface 101 of the mounting board 10.

Figure 7:
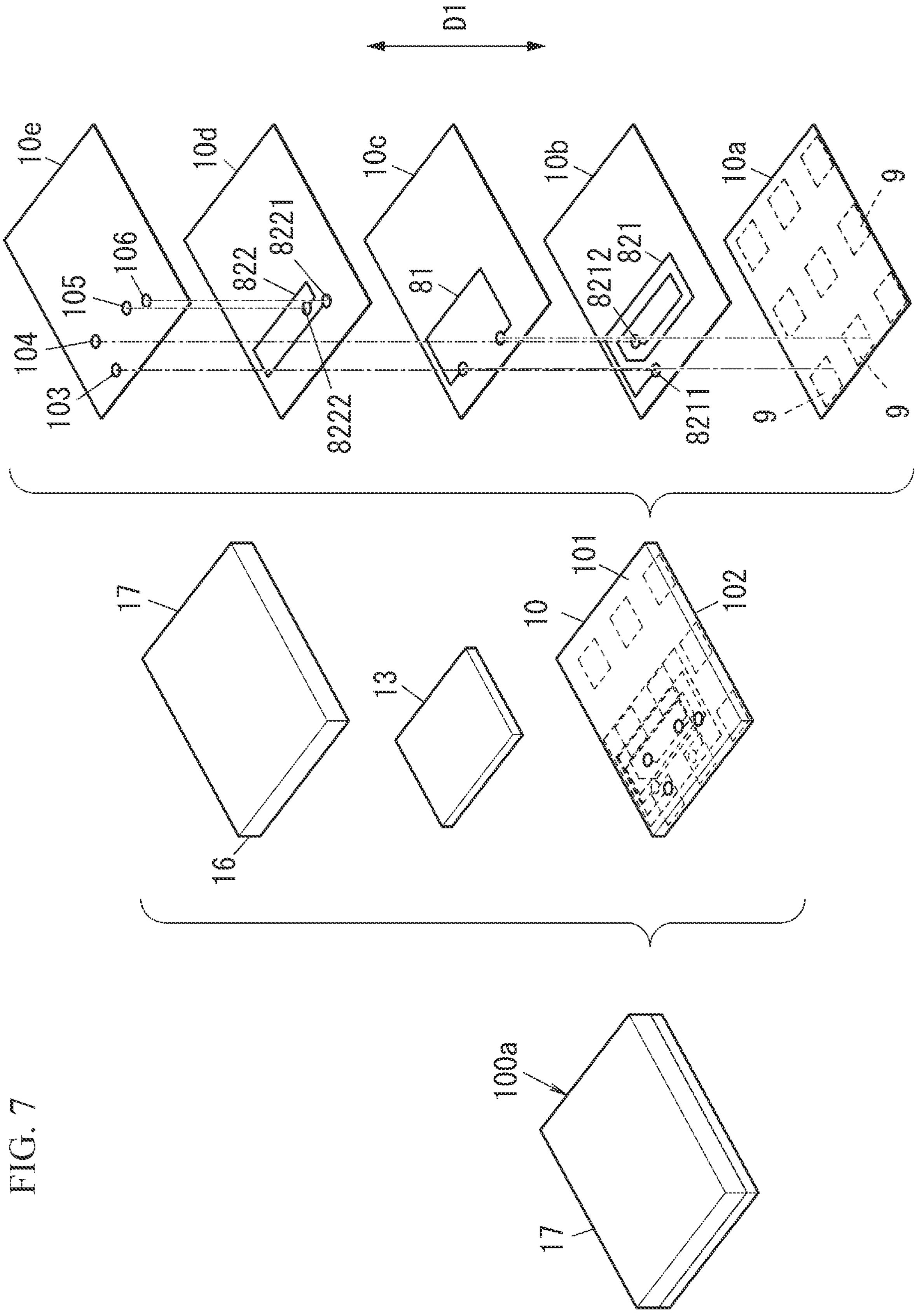
FIG. 7 is a perspective view of a high-frequency module according to a modification of the first embodiment.

The high-frequency module 100a according to the modification includes the mounting board 10, the first IC chip 13, the first resin layer 16, and the metal electrode layer 17, as shown in FIG. 7. The first IC chip 13 includes the fifth switch 55, the first selector switch 84, the short-circuiting switch 85, and the second selector switch 86, as described above.

The mounting board 10 is, for example, a multilayer board having a plurality of (five in the illustrated example) layers 10a to 10e. The plurality of layers 10a to 10e include the first layer 10a, the second layer 10b, the third layer 10c, the fourth layer 10d, and the fifth layer 10e.

A plurality of (nine in the illustrated example) external connection terminals 9 are arranged at one surface (a reverse side) of the first layer 10a. A conductor pattern portion constituting the first sub-line 821 is formed on one surface (an obverse side) of the second layer 10b. A conductor pattern portion constituting the main line 81 is formed on one surface (an obverse side) of the third layer 10c. A conductor pattern portion constituting the second sub-line 822 is formed on one surface (an obverse side) of the fourth layer 10d. A plurality of (four in the illustrated example) terminals 103 to 106 are formed at the fifth layer 10e.

The terminal 103 corresponds to the first end 8211 of the first sub-line 821 and is connected to the first end 8211 of the first sub-line 821 via a via conductor (not shown). The terminal 104 corresponds to the second end 8212 of the first sub-line 821 and is connected to the second end 8212 of the first sub-line 821 via a via conductor (not shown). The terminal 105 corresponds to the second end 8222 of the second sub-line 822 and is connected to the second end 8222 of the second sub-line 822 via a via conductor (not shown). The terminal 106 corresponds to the first end 8221 of the second sub-line 822 and is connected to the first end 8221 of the second sub-line 822 via a via conductor (not shown).

In the mounting board 10, the first layer 10a, the second layer 10b, the third layer 10c, the fourth layer 10d, and the fifth layer 10e are stacked in this order from the bottom. For this reason, the main line 81, the first sub-line 821, and the second sub-line 822 are provided inside the mounting board (multilayer board) 10. The first IC chip 13 is arranged at the first principal surface 101 (an obverse side of the fifth layer 10e) of the mounting board 10. The above-described configuration, in which the main line 81, the first sub-line 821, and the second sub-line 822 are provided inside the mounting board 10, and the first IC chip 13 is arranged at the first principal surface 101 of the mounting board 10, makes it possible to avoid transmission of a high-output signal through the first selector switch 84 and the second selector switch 86 and reduce distortion of a signal (high-frequency signal) transmitted through the main line 81. Additionally, the first resin layer 16 is arranged on the first principal surface 101 of the mounting board 10 so as to cover the first IC chip 13. The metal electrode layer 17 is arranged on the first principal surface 101 side of the mounting board 10 so as to cover the first resin layer 16. The high-frequency module 100a according to the modification can be mounted on a motherboard inside a mobile phone or the like via the external connection terminals 9. The high-frequency module 100a may be mounted as a submodule on either one principal surface of the first principal surface 101 and the second principal surface 102 of the mounting board 10 in the high-frequency module 100 according to the first embodiment.

Figure 8:
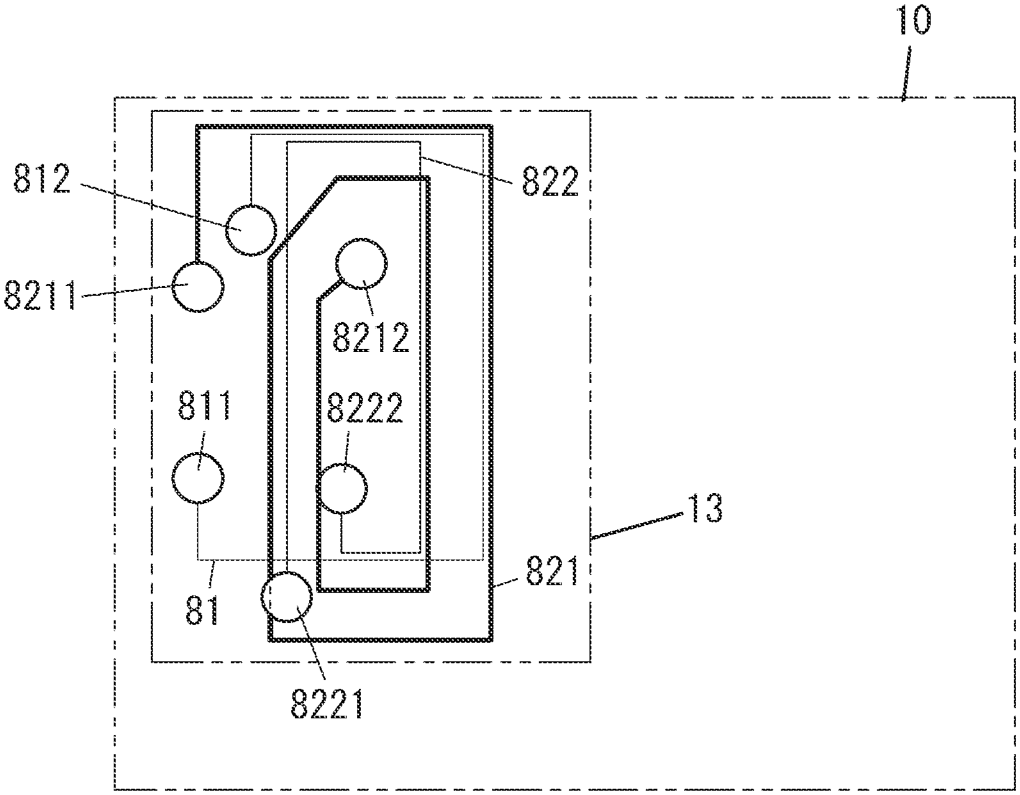
FIG. 8 relates to the high-frequency module and is a plan view showing a positional relationship of a main line, a first sub-line, and a second sub-line with an IC chip.

In the high-frequency module 100a according to the modification, the main line 81, the first sub-line 821, and the second sub-line 822 overlap with the first IC chip 13 in plan view from a thickness direction D1 (see FIG. 7) of the mounting board 10, as shown in FIG. 8. For this reason, a distance of connection between the first IC chip 13 and the directional coupler 8 can be shortened. As a result, it is possible to reduce appearance of an optional inductor. Note that the first IC chip 13 may overlap with any one or any two of the main line 81, the first sub-line 821, and the second sub-line 822 in plan view from the thickness direction D1 of the mounting board 10. That is, the first IC chip 13 only needs to overlap with at least one of the main line 81, the first sub-line 821, and the second sub-line 822 in plan view from the thickness direction D1 of the mounting board 10. Although the main line 81 and the first and second sub-lines 821 and 822 are arranged so as to overlap at least partially in plan view from the thickness direction D1 of the mounting board 10 in FIG. 8, the main line 81 and the first and second sub-lines 821 and 822 may be arranged at positions not overlapping with each other if electromagnetic coupling between the main line 81 and the first and second sub-lines 821 and 822 is higher than a suitable degree of coupling. Alternatively, a configuration in which the main line 81 and at least one of the first sub-line 821 and the second sub-line are arranged close to each other on the same layer may be adopted.

Second Embodiment

A directional coupler 8a according to a second embodiment will be described with reference to FIG. 9 and FIGS. 10A to 10C. As for the directional coupler 8a according to the second embodiment, same constituent elements as those of the directional coupler 8 according to the first embodiment are denoted by same reference characters, and a description thereof will be omitted.

The directional coupler 8a according to the second embodiment is different from the directional coupler 8 according to the first embodiment in that a phase circuit 88 is provided in a signal path R1 between a first end 8211 of a first sub-line 821 and a second end 8222 of a second sub-line 822. The directional coupler 8a according to the second embodiment is also different from the directional coupler 8 according to the first embodiment in that a switch 89 is provided in a signal path between a second end 8802 of the phase circuit 88 and the second end 8222 of the second sub-line 822.

(1) Configuration

Figure 9:
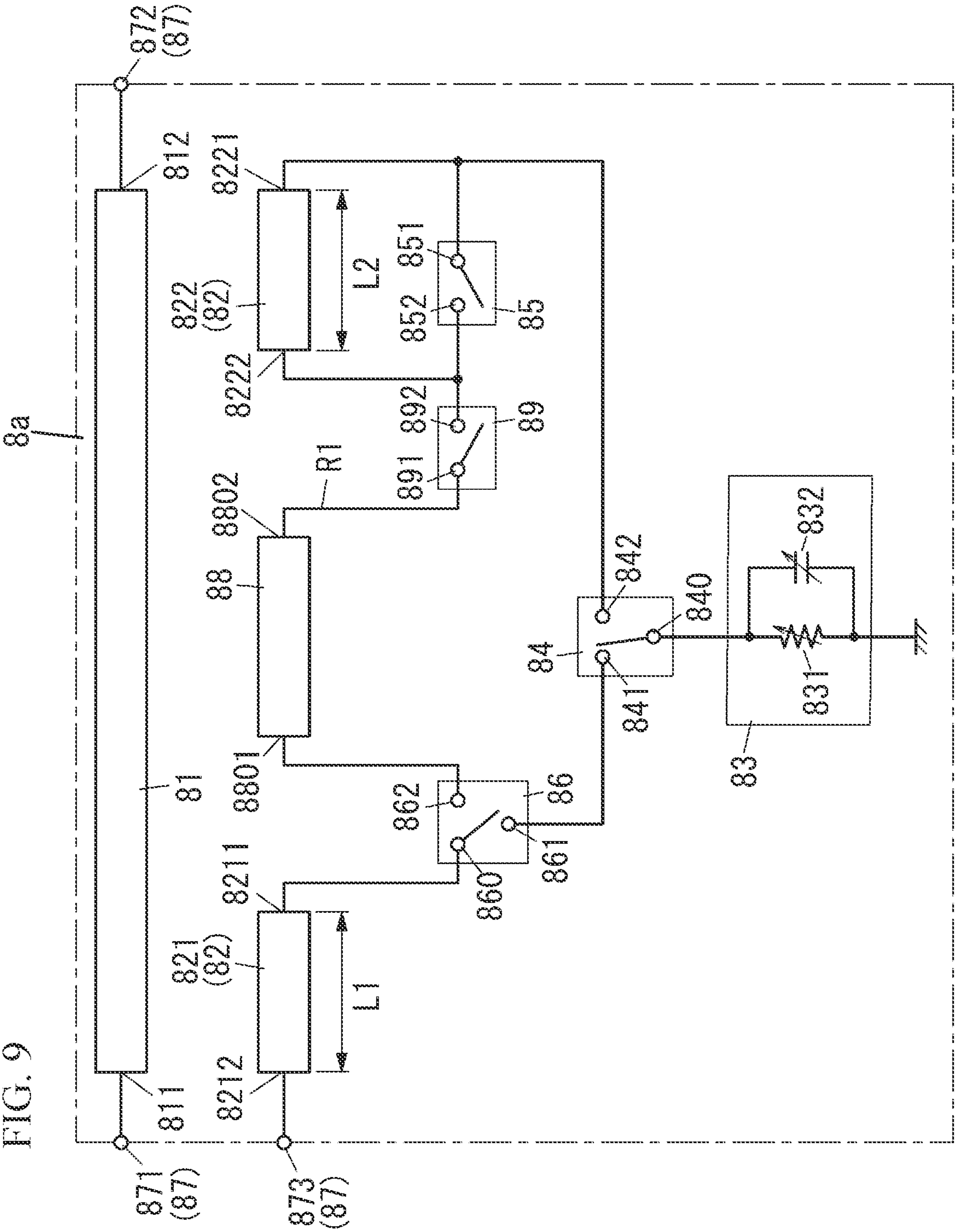
FIG. 9 is a circuit diagram of a directional coupler according to a second embodiment.

The directional coupler 8a according to the second embodiment includes a main line 81, the first sub-line 821, the second sub-line 822, a termination circuit 83, a first selector switch 84, a short-circuiting switch 85, a second selector switch 86, the phase circuit 88, and the switch 89, as shown in FIG. 9. The directional coupler 8*a* further includes a first connection terminal 871, a second connection terminal 872, and a third connection terminal 873.

The main line 81 has a first end 811 and a second end 812 which are both ends in a longitudinal direction of the main line 81. The first end 811 of the main line 81 is connected to the first connection terminal 871. The first end 811 of the main line 81 is also connected to an antenna terminal 91 (see FIG. 3) via the first connection terminal 871. The second end 812 of the main line 81 is connected to the second connection terminal 872. The second end 812 of the main line 81 is connected to a diplexer 60 (see FIG. 3) via the second connection terminal 872.

The first sub-line 821 has the first end 8211 and a second end 8212 which are both ends in a longitudinal direction of the first sub-line 821. The first end 8211 of the first sub-line 821 is connected to a common terminal 860 of the second selector switch 86. The second end 8212 of the first sub-line 821 is connected to the third connection terminal 873. The second end 8212 of the first sub-line 821 is connected to a coupling terminal 96 (see FIG. 3) via the third connection terminal 873.

The second sub-line 822 has a first end 8221 and the second end 8222 which are both ends in a longitudinal direction of the second sub-line 822. The first end 8221 of the second sub-line 822 is connected to a selection terminal 842 of the first selector switch 84. The second end 8222 of the second sub-line 822 is connected to a terminal 892 of the switch 89.

The first sub-line 821 and the second sub-line 822 are lined up along the longitudinal direction (a lateral direction in FIG. 9) of the main line 81, as shown in FIG. 9. A length L1 of the first sub-line 821 and a length L2 of the second sub-line 822 are the same. Note that the length L1 of the first sub-line 821 and the length L2 of the second sub-line 822 may be different. In this case, the length L2 of the second sub-line 822 may be longer or shorter than the length L1 of the first sub-line 821.

The phase circuit 88 is provided in the signal path R1 between the first end 8211 of the first sub-line 821 and the second end 8222 of the second sub-line 822. More particularly, a first end 8801 of the phase circuit 88 is connected to a selection terminal 862 of the second selector switch 86, and the second end 8802 of the phase circuit 88 is connected to a terminal 891 of the switch 89.

Figure 10A:
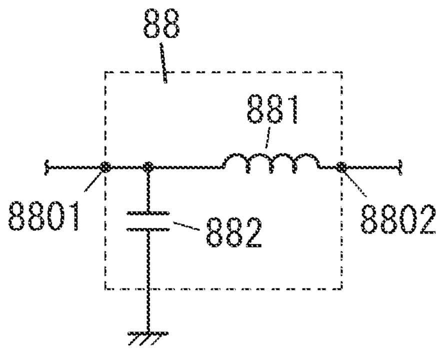
FIGS. 10A to 10C are circuit diagrams of phase circuits to be used in the directional coupler.

The phase circuit 88 has, for example, an inductor 881 and a capacitor 882, as shown in FIG. 10A. That is, the phase circuit 88 has a low pass filter which is composed of the inductor 881 and the capacitor 882. The inductor 881 is connected between the both ends (the first end 8801 and the second end 8802) of the phase circuit 88. The capacitor 882 is connected between a ground and a junction of the first end 8801 and the inductor 881 of the phase circuit 88.

The phase circuit 88 can be included in the above-described first IC chip 13 (see FIG. 5). That is, the first IC chip 13 can further include the phase circuit 88 in addition to the above-described fifth switch 55, the first selector switch 84, the short-circuiting switch 85, and the second selector switch 86. For this reason, the main line 81 that is formed inside a mounting board 10 can be physically separated from the phase circuit 88. As a result, it is possible to inhibit unnecessary coupling between the main line 81 and the phase circuit 88. If the phase circuit 88 is arranged close to the second selector switch 86, a distance of connection between the phase circuit 88 and the second selector switch 86 can be shortened. Consequently, it is possible to perform phase adjustment of the first sub-line 821 and the second sub-line 822 with high accuracy.

The first selector switch 84 has a common terminal 840 and a plurality of (two in the illustrated example) selection terminals 841 and 842. The common terminal 840 is connected to the termination circuit 83. The selection terminal 841 is connected to a selection terminal 861 of the second selector switch 86. The selection terminal 842 is connected to the first end 8221 of the second sub-line 822. In the present embodiment, the first selector switch 84 is a selector switch. In the present embodiment, the common terminal 840 is a first terminal, the selection terminal 841 is a second terminal, and the selection terminal 842 is a third terminal.

The second selector switch 86 has the common terminal 860 and the plurality of (two in the illustrated example) selection terminals 861 and 862. The common terminal 860 is connected to the first end 8211 of the first sub-line 821. The selection terminal 861 is connected to the selection terminal 841 of the first selector switch 84. The selection terminal 862 is connected to the first end 8801 of the phase circuit 88. In the present embodiment, the common terminal 860 is a fourth terminal, the selection terminal 861 is a fifth terminal, and the selection terminal 862 is a sixth terminal.

The short-circuiting switch 85 has two terminals 851 and 852. The short-circuiting switch 85 is connected between the both ends of the second sub-line 822. More particularly, the terminal 851 is connected to the first end 8221 of the second sub-line 822, and the terminal 852 is connected to the second end 8222 of the second sub-line 822.

The switch 89 has the two terminals 891 and 892. The switch 89 is provided in a signal path between the phase circuit 88 and the second sub-line 822. More particularly, the terminal 891 is connected to the second end 8802 of the phase circuit 88, and the terminal 892 is connected to the second end 8222 of the second sub-line 822.

The directional coupler 8*a* according to the second embodiment has a first mode and a second mode. The first mode is a mode of detecting a signal in a first frequency band of signals transmitted through the main line 81. The second mode is a mode of detecting a signal in a second frequency band of signals transmitted through the main line 81. The first frequency band here is a band higher in frequency than the second frequency band. That is, in the directional coupler 8*a* according to the second embodiment, the first mode is a high-band (HB) mode, and the second mode is a low-band (LB) mode.

(2) Operation

(2.1) First Mode

The directional coupler 8*a* according to the second embodiment connects the common terminal 840 and the selection terminal 841 of the first selector switch 84, connects the common terminal 860 and the selection terminal 861 of the second selector switch 86, and connects the terminal 851 and the terminal 852 of the short-circuiting switch 85 in the first mode. For this reason, the first sub-line 821 and the termination circuit 83 are connected, and a signal in the first frequency band of signals (transmission signals or reception signals) transmitted through the main line 81 is detected in the first sub-line 821.

In the first mode, the second sub-line 822 forms a closed circuit by use of the short-circuiting switch 85. For this reason, an electromagnetic field appearing around the second sub-line 822 can be inhibited from spreading, and the degree of coupling between the main line 81 and the second sub-line 822 can be weakened. As a result, it is possible to reduce leakage of a signal from the main line 81 to the second sub-line 822 and reduce loss of a signal passing through the main line 81.

(2.2) Second Mode

The directional coupler 8*a* according to the second embodiment connects the common terminal 840 and the selection terminal 842 of the first selector switch 84, connects the common terminal 860 and the selection terminal 862 of the second selector switch 86, and connects the terminal 891 and the terminal 892 of the switch 89 in the second mode. For this reason, the first sub-line 821 and the second sub-line 822 are connected to the termination circuit 83. In the directional coupler 8*a* according to the second embodiment, the phase circuit 88 is provided in the signal path R1 between the first sub-line 821 and the second sub-line 822, and phases of the first sub-line 821 and the second sub-line 822 can be adjusted. As a result, a signal high in frequency is unlikely to flow to the first sub-line 821 and the second sub-line 822. It is thus possible to apply the directional coupler 8*a* to a wide band.

(3) Modification

The directional coupler 8*a* may include a phase circuit 88*a* or a phase circuit 88*b* instead of the phase circuit 88.

Figure 10B:
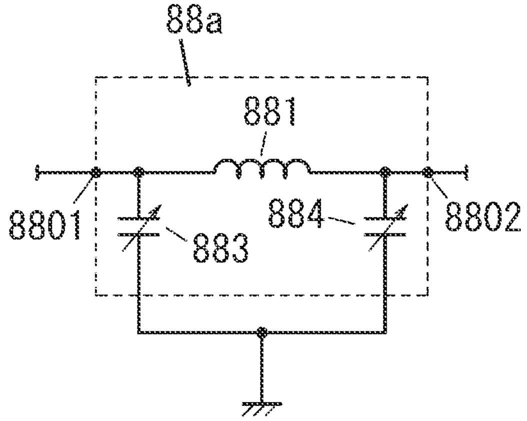

The phase circuit 88*a* has, for example, the inductor 881 and a plurality of (two in the illustrated example) variable capacitors 883 and 884, as shown in FIG. 10B. The inductor 881 is connected between both ends (the first end 8801 and the second end 8802) of the phase circuit 88*a*. The variable capacitor 883 is connected between a ground and a junction of the first end 8801 and the inductor 881 of the phase circuit 88*a*. The variable capacitor 884 is connected between the ground and a junction of the second end 8802 and the inductor 881 of the phase circuit 88*a*.

Figure 10C:
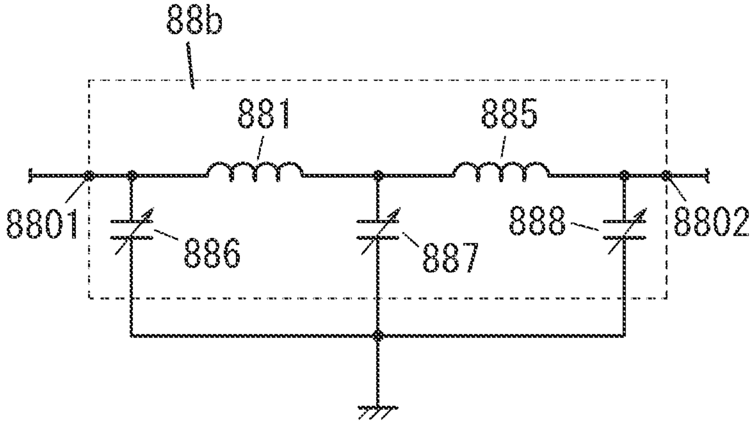

The phase circuit 88*b* has, for example, a plurality of (two in the illustrated example) inductors 881 and 885 and a plurality of (three in the illustrated example) variable capacitors 886 to 888, as shown in FIG. 10C. The plurality of inductors 881 and 885 are series-connected to each other and are connected between both ends (the first end 8801 and the second end 8802) of the phase circuit 88*b*. The variable capacitor 886 is connected between the ground and a junction of the first end 8801 and the inductor 881 of the phase circuit 88*b*. The variable capacitor 887 is connected between the ground and a junction of the inductor 881 and the inductor 885. The variable capacitor 886 is connected between the ground and a junction of the second end 8802 and the inductor 885 of the phase circuit 88*b*.

Also in the above-described cases, phases of the first sub-line 821 and the second sub-line 822 can be adjusted as in the phase circuit 88. As a result, a signal high in frequency is unlikely to flow to the first sub-line 821 and the second sub-line 822, and the directional coupler 8*a* can be applied to a wide band.

The directional coupler 8*a* according to the second embodiment is configured to be capable of switching connection destinations, for example, such that a connection destination of the second end 8212 of the first sub-line 821 is the termination circuit 83 and such that a connection destination of the common terminal 840 of the first selector switch 84 is the third connection terminal 873. This configuration allows detection of both a transmission signal and a reception signal. In this case, the phase circuit 88*a* (or the phase circuit 88*b*) can perform adjustment in impedance between a case of detecting a transmission signal and a case of detecting a reception signal.

A case of detecting both a transmission signal and a reception signal can also be handled by providing two detection circuits, each composed of the main line 81, the first sub-line 821, the second sub-line 822, the termination circuit 83, the first selector switch 84, the short-circuiting switch 85, the second selector switch 86, the phase circuit 88*a* (or the phase circuit 88*b*), and the switch 89 described above.

Third Embodiment

A directional coupler 8*b* according to a third embodiment will be described with reference to FIG. 11. As for the directional coupler 8*b* according to the third embodiment, same constituent elements as those of the directional coupler 8 according to the first embodiment are denoted by same reference characters, and a description thereof will be omitted.

The directional coupler 8*b* according to the third embodiment is different from the directional coupler 8 according to the first embodiment in that the directional coupler 8*b* further includes a third sub-line 823 in addition to a first sub-line 821 and a second sub-line 822. The directional coupler 8*b* according to the third embodiment is also different from the directional coupler 8 according to the first embodiment in that the directional coupler 8*b* further includes a first short-circuiting switch 80 which is different from a second short-circuiting switch 85 as a short-circuiting switch. The directional coupler 8*b* according to the third embodiment is also different from the directional coupler 8 according to the first embodiment in that the directional coupler 8*b* further includes a third selector switch 90 in addition to a first selector switch 84 and a second selector switch 86.

(1) Configuration

Figure 11:
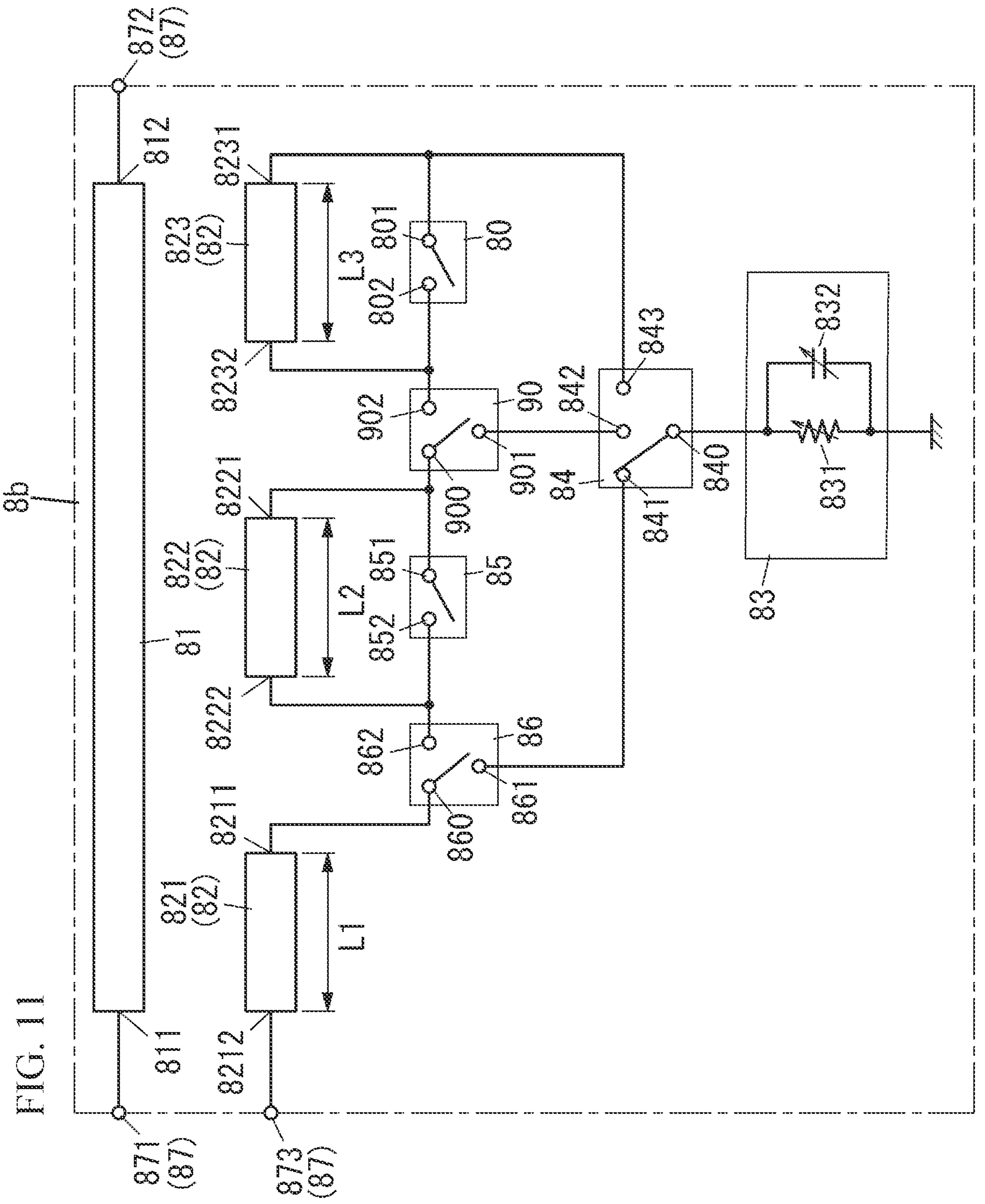
FIG. 11 is a circuit diagram of a directional coupler according to a third embodiment.

The directional coupler 8*b* according to the third embodiment includes a main line 81, the first sub-line 821, the second sub-line 822, the third sub-line 823, and a termination circuit 83, as shown in FIG. 11. The directional coupler 8*b* according to the third embodiment further includes the first selector switch 84, the second selector switch 86, and the third selector switch 90. The directional coupler 8*b* according to the third embodiment further includes the first short-circuiting switch 80 and the second short-circuiting switch 85.

The main line 81 has a first end 811 and a second end 812 which are both ends in a longitudinal direction of the main line 81. The first end 811 of the main line 81 is connected to a first connection terminal 871. The first end 811 of the main line 81 is also connected to an antenna terminal 91 (see FIG. 3) via the first connection terminal 871. The second end 812 of the main line 81 is connected to a second connection terminal 872. The second end 812 of the main line 81 is connected to a diplexer 60 (see FIG. 3) via the second connection terminal 872.

The first sub-line 821 has a first end 8211 and a second end 8212 which are both ends in a longitudinal direction of the first sub-line 821. The first end 8211 of the first sub-line 821 is connected to a common terminal 860 of the second selector switch 86. The second end 8212 of the first sub-line 821 is connected to a third connection terminal 873. The second end 8212 of the first sub-line 821 is connected to a coupling terminal 96 (see FIG. 3) via the third connection terminal 873.

The second sub-line 822 has a first end 8221 and a second end 8222 which are both ends in a longitudinal direction of the second sub-line 822. The first end 8221 of the second sub-line 822 is connected to a common terminal 900 of the third selector switch 90. The second end 8222 of the second sub-line 822 is connected to a selection terminal 862 of the second selector switch 86.

The third sub-line 823 has a first end 8231 and a second end 8232 which are both ends in a longitudinal direction of the third sub-line 823. The first end 8231 of the third sub-line 823 is connected to a selection terminal 843 of the first selector switch 84. The second end 8232 of the third sub-line 823 is connected to a selection terminal 902 of the third selector switch 90.

The first sub-line 821, the second sub-line 822, and the third sub-line 823 are lined up along the longitudinal direction (a lateral direction in FIG. 11) of the main line 81, as shown in FIG. 11. A length L1 of the first sub-line 821, a length L2 of the second sub-line 822, and a length L3 of the third sub-line 823 are the same. Note that the length L1 of the first sub-line 821, the length L2 of the second sub-line 822, and the length L3 of the third sub-line 823 may be different. That is, the length L2 of the second sub-line 822 may be longer or shorter than the length L1 of the first sub-line 821. The length L3 of the third sub-line 823 may be longer or shorter than the length L1 of the first sub-line 821 and the length L2 of the second sub-line 822.

The first selector switch 84 has a common terminal 840 and a plurality of (three in the illustrated example) selection terminals 841, 842, and 843. The common terminal 840 is connected to the termination circuit 83. The selection terminal 841 is connected to a selection terminal 861 of the second selector switch 86. The selection terminal 842 is connected to a selection terminal 901 of the third selector switch 90. The selection terminal 843 is connected to the first end 8231 of the third sub-line 823. In the present embodiment, the first selector switch 84 is a selector switch. In the present embodiment, the common terminal 840 is a first terminal, the selection terminal 841 is a second terminal, and the selection terminal 842 is a third terminal.

The second selector switch 86 has the common terminal 860 and the plurality of (two in the illustrated example) selection terminals 861 and 862. The common terminal 860 is connected to the first end 8211 of the first sub-line 821. The selection terminal 861 is connected to the selection terminal 841 of the first selector switch 84. The selection terminal 862 is connected to the second end 8222 of the second sub-line 822. In the present embodiment, the common terminal 860 is a fourth terminal, the selection terminal 861 is a fifth terminal, and the selection terminal 862 is a sixth terminal.

The third selector switch 90 has the common terminal 900 and a plurality of (two in the illustrated example) selection terminals 901 and 902. The common terminal 900 is connected to the first end 8221 of the second sub-line 822. The selection terminal 901 is connected to the selection terminal 842 of the first selector switch 84. The selection terminal 902 is connected to the second end 8232 of the third sub-line 823.

The first short-circuiting switch 80 has two terminals 801 and 802. The first short-circuiting switch 80 is connected between the first end 8231 and the second end 8232 of the third sub-line 823. More particularly, the terminal 801 is connected to the first end 8231 of the third sub-line 823, and the terminal 802 is connected to the second end 8232 of the third sub-line 823.

The second short-circuiting switch 85 has two terminals 851 and 852. The second short-circuiting switch 85 is connected between the first end 8221 and the second end 8222 of the second sub-line 822. More particularly, the terminal 851 is connected to the first end 8221 of the second sub-line 822, and the terminal 852 is connected to the second end 8222 of the second sub-line 822.

The directional coupler **8*b* according to the third embodiment has a first mode, a second mode, and a third mode. The first mode is a mode of detecting a signal in a first frequency band of signals transmitted through the main line 81. The second mode is a mode of detecting a signal in a second frequency band of signals transmitted through the main line 81. The third mode is a mode of detecting a signal in a third frequency band of signals transmitted through the main line 81. The first frequency band here is a band higher in frequency than the second frequency band. The second frequency band is a band higher in frequency than the third frequency band. That is, in the directional coupler 8*b*** according to the third embodiment, the first mode is a high-band (HB) mode, the second mode is a mid-band (MB) mode, and the third mode is a low-band (LB) mode.

(2) Operation

(2.1) First Mode

The directional coupler **8*b* according to the third embodiment connects the common terminal 840 and the selection terminal 841 of the first selector switch 84, connects the common terminal 860 and the selection terminal 861 of the second selector switch 86, connects the terminal 801 and the terminal 802 of the first short-circuiting switch 80, and connects the terminal 851 and the terminal 852 of the second short-circuiting switch 85 in the first mode. At this time, the common terminal 900 of the third selector switch 90 is not connected to any of the plurality of selection terminals 901 and 902. For this reason, the first sub-line 821 and the termination circuit 83 are connected, and a signal in the first frequency band of signals (transmission signals or reception signals) transmitted through the main line 81 is detected in the first sub-line 821**.

In the first mode, the second sub-line 822 forms a closed circuit by use of the second short-circuiting switch 85. For this reason, an electromagnetic field appearing around the second sub-line 822 can be inhibited from spreading, and the degree of coupling between the main line 81 and the second sub-line 822 can be weakened. As a result, it is possible to reduce leakage of a signal from the main line 81 to the second sub-line 822 and reduce loss of a signal (a transmission signal or a reception signal) transmitted through the main line 81.

In the first mode, the third sub-line 823 forms a closed circuit by use of the first short-circuiting switch 80. For this reason, an electromagnetic field appearing around the third sub-line 823 can be inhibited from spreading, and the degree of coupling between the main line 81 and the third sub-line 823 can be weakened. As a result, it is possible to reduce leakage of a signal from the main line 81 to the third sub-line 823 and reduce loss of a signal (a transmission signal or a reception signal) transmitted through the main line 81.

(2.2) Second Mode

The directional coupler **8*b* according to the third embodiment connects the common terminal 840 and the selection terminal 842 of the first selector switch 84, connects the common terminal 860 and the selection terminal 862 of the second selector switch 86, connects the common terminal 900 and the selection terminal 901 of the third selector switch 90, and connects the terminal 801 and the terminal 802 of the first short-circuiting switch 80 in the second mode. At this time, the terminal 851 and the terminal 852 of the second short-circuiting switch 85 are disconnected from each other. For this reason, the first sub-line 821 and the second sub-line 822 that are series-connected are connected to the termination circuit 83, and a signal in the second frequency band of signals (transmission signals or reception signals) transmitted through the main line 81 is detected in the first sub-line 821 and the second sub-line 822**.

In the second mode, the third sub-line 823 forms a closed circuit by use of the first short-circuiting switch 80. For this reason, an electromagnetic field appearing around the third sub-line 823 can be inhibited from spreading, and the degree of coupling between the main line 81 and the third sub-line 823 can be weakened. As a result, it is possible to reduce leakage of a signal from the main line 81 to the third sub-line 823 and reduce loss of a signal (a transmission signal or a reception signal) transmitted through the main line 81.

(2.3) Third Mode

The directional coupler 8*b* according to the third embodiment connects the common terminal 840 and the selection terminal 843 of the first selector switch 84, connects the common terminal 860 and the selection terminal 862 of the second selector switch 86, and connects the common terminal 900 and the selection terminal 902 of the third selector switch 90 in the third mode. At this time, the terminal 801 and the terminal 802 of the first short-circuiting switch 80 are disconnected from each other, and the terminal 851 and the terminal 852 of the second short-circuiting switch 85 are disconnected from each other. For this reason, the first sub-line 821, the second sub-line 822, and the third sub-line 823 that are series-connected are connected to the termination circuit 83, and a signal in the third frequency band of signals (transmission signals or reception signals) transmitted through the main line 81 is detected in the first sub-line 821, the second sub-line 822, and the third sub-line 823.

Fourth Embodiment

A directional coupler 8*c* according to a fourth embodiment will be described with reference to FIG. 12. As for the directional coupler 8*c* according to the fourth embodiment, same constituent elements as those of the directional coupler 8 according to the first embodiment are denoted by same reference characters, and a description thereof will be omitted.

The directional coupler 8*c* according to the fourth embodiment is different from the directional coupler 8 according to the first embodiment in that a length L1 of a first sub-line 821 is shorter than a length L2 of a second sub-line 822 and that selector switches are brought together.

(1) Configuration

Figure 12:
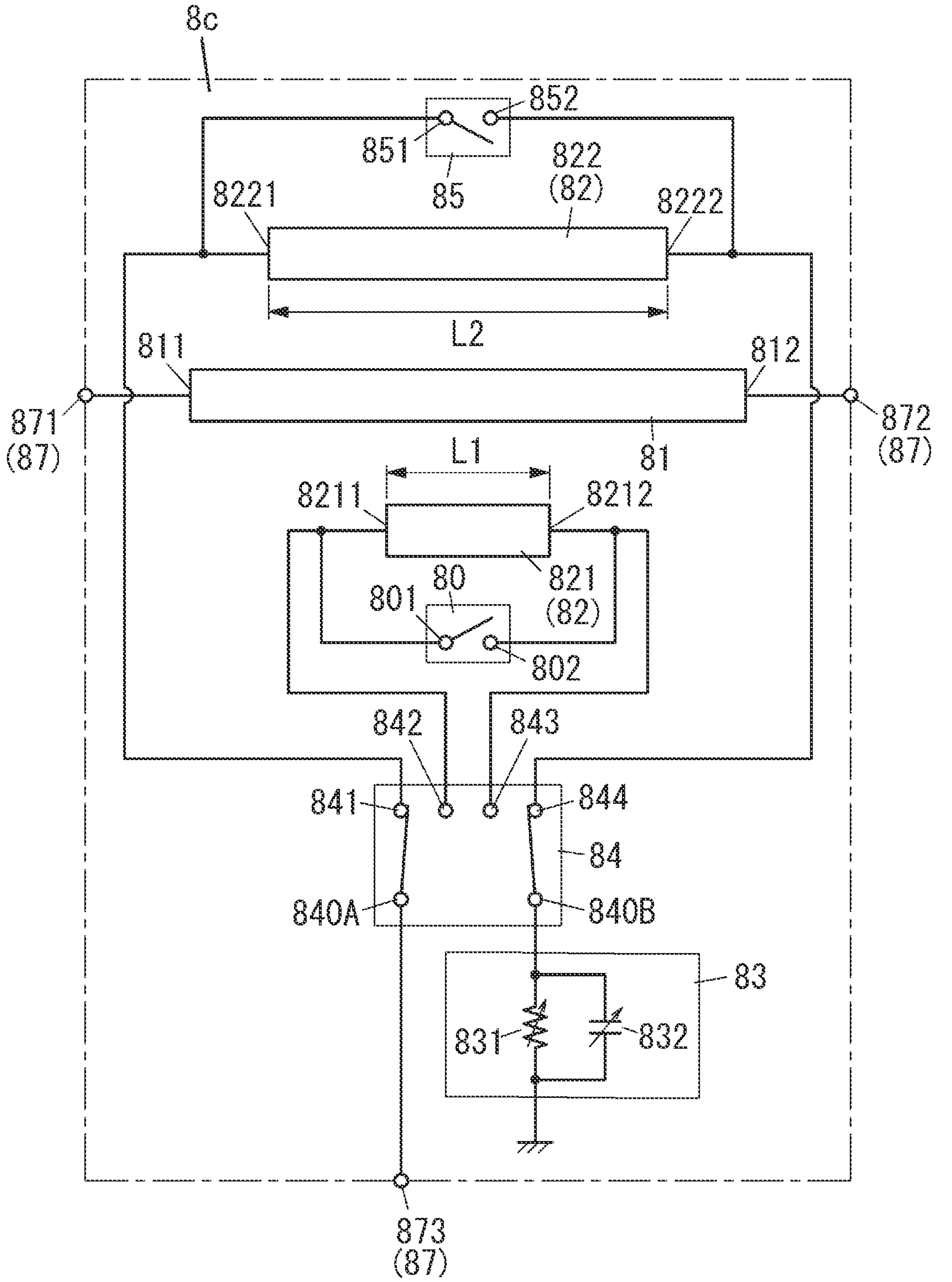
FIG. 12 is a circuit diagram of a directional coupler according to a fourth embodiment.

The directional coupler 8*c* according to the fourth embodiment includes a main line 81, the first sub-line 821, the second sub-line 822, and a termination circuit 83, as shown in FIG. 12. The directional coupler 8*c* according to the fourth embodiment further includes a first selector switch 84, a first short-circuiting switch 80, and a second short-circuiting switch 85.

The main line 81 has a first end 811 and a second end 812 which are both ends in a longitudinal direction of the main line 81. The first end 811 of the main line 81 is connected to a first connection terminal 871. The first end 811 of the main line 81 is also connected to an antenna terminal 91 (see FIG. 3) via the first connection terminal 871. The second end 812 of the main line 81 is connected to a second connection terminal 872. The second end 812 of the main line 81 is connected to a diplexer 60 (see FIG. 3) via the second connection terminal 872.

The first sub-line 821 has a first end 8211 and a second end 8212 which are both ends in a longitudinal direction of the first sub-line 821. The first end 8211 of the first sub-line 821 is connected to a selection terminal 842 of the first selector switch 84. The second end 8212 of the first sub-line 821 is connected to a selection terminal 843 of the first selector switch 84.

The second sub-line 822 has a first end 8221 and a second end 8222 which are both ends in a longitudinal direction of the second sub-line 822. The first end 8221 of the second sub-line 822 is connected to a selection terminal 841 of the first selector switch 84. The second end 8222 of the second sub-line 822 is connected to a selection terminal 844 of the first selector switch 84. As shown in FIG. 12, the length L2 of the second sub-line 822 is longer than the length L1 of the first sub-line 821. Thus, the first sub-line 821 having a relatively short line length is selected in a first mode (to be described later), and the second sub-line 822 having a relatively long line length is selected in a second mode (to be described later).

The first selector switch 84 has a plurality of (two in the illustrated example) common terminals 840A and 840B and the plurality of (four in the illustrated example) selection terminals 841 to 844. The common terminal 840A is connected to the third connection terminal 873. The common terminal 840A is connected to a coupling terminal 96 (see FIG. 3) via the third connection terminal 873. The common terminal 840B is connected to the termination circuit 83. The selection terminal 841 is connected to the first end 8221 of the second sub-line 822. The selection terminal 842 is connected to the first end 8211 of the first sub-line 821. The selection terminal 843 is connected to the second end 8212 of the first sub-line 821. The selection terminal 844 is connected to the second end 8222 of the second sub-line 822. In the present embodiment, the first selector switch 84 is a selector switch.

The first short-circuiting switch 80 has two terminals 801 and 802. The first short-circuiting switch 80 is connected between the first end 8211 and the second end 8212 of the first sub-line 821. More particularly, the terminal 801 is connected to the first end 8211 of the first sub-line 821, and the terminal 802 is connected to the second end 8212 of the first sub-line 821.

The second short-circuiting switch 85 has two terminals 851 and 852. The second short-circuiting switch 85 is connected between the first end 8221 and the second end 8222 of the second sub-line 822. More particularly, the terminal 851 is connected to the first end 8221 of the second sub-line 822, and the terminal 852 is connected to the second end 8222 of the second sub-line 822. In the present embodiment, the second short-circuiting switch 85 is a short-circuiting switch.

The directional coupler 8*c* according to the fourth embodiment has the first mode and the second mode. The first mode is a mode of detecting a signal in a first frequency band of signals passing through the main line 81. The second mode is a mode of detecting a signal in a second frequency band of signals passing through the main line 81. The first frequency band here is a band higher in frequency than the second frequency band. That is, in the directional coupler 8*c* according to the fourth embodiment, the first mode is a high-band (HB) mode, and the second mode is a low-band (LB) mode.

(2) Operation (2.1) First Mode

The directional coupler 8*c* according to the fourth embodiment connects the common terminal 840A and the selection terminal 842 of the first selector switch 84 and connects the common terminal 840B and the selection terminal 843 in the first mode. In the first mode, the terminal 851 and the terminal 852 of the second short-circuiting switch 85 are connected. In the first mode, the terminal 801 and the terminal 802 of the first short-circuiting switch 80 are disconnected from each other. For this reason, the first sub-line 821 and the termination circuit 83 are connected, and a signal in the first frequency band of signals (transmission signals or reception signals) transmitted through the main line 81 is detected in the first sub-line 821.

In the first mode, the second sub-line 822 forms a closed circuit by use of the second short-circuiting switch 85. For this reason, an electromagnetic field appearing around the second sub-line 822 can be inhibited from spreading, and the degree of coupling between the main line 81 and the second sub-line 822 can be weakened. As a result, it is possible to reduce leakage of a signal from the main line 81 to the second sub-line 822 and reduce loss of a signal (a transmission signal or a reception signal) transmitted through the main line 81.

(2.2) Second Mode

The directional coupler 8*c* according to the fourth embodiment connects the common terminal 840A and the selection terminal 841 of the first selector switch 84 and connects the common terminal 840B and the selection terminal 844 in the second mode. In the second mode, the terminal 801 and the terminal 802 of the first short-circuiting switch 80 are connected. In the second mode, the terminal 851 and the terminal 852 of the second short-circuiting switch 85 are disconnected from each other. For this reason, the second sub-line 822 and the termination circuit 83 are connected, and a signal in the second frequency band of signals (transmission signals or reception signals) transmitted through the main line 81 is detected in the second sub-line 822.

In the second mode, the first sub-line 821 forms a closed circuit by use of the first short-circuiting switch 80. For this reason, an electromagnetic field appearing around the first sub-line 821 can be inhibited from spreading, and the degree of coupling between the main line 81 and the first sub-line 821 can be weakened. As a result, it is possible to reduce leakage of a signal from the main line 81 to the first sub-line 821 and reduce loss of a signal (a transmission signal or a reception signal) transmitted through the main line 81.

Other Modifications

The above-described first to fourth embodiments and the like are each merely one of various embodiments of the present disclosure. The above-described first to fourth embodiments and the like can be variously changed in accordance with, for example, a design of the present disclosure can be attained. Constituent elements different from each other of embodiments different from each other may be appropriately combined.

In the high-frequency module 100, the metal electrode layer 17 is not limited to a case where the metal electrode layer 17 covers a whole of the principal surface on the side opposite to the mounting board 10 side of the first resin layer 16 and may cover at least a part of the principal surface of the first resin layer 16.

Each of the plurality of filters 601 and 602, the plurality of transmitting filters 611, 621, 631, and 641, and the plurality of receiving filters 612, 622, 632, and 642 is not limited to a surface acoustic wave filter and may be, for example, a bulk acoustic wave (BAW) filter. A resonator in the BAW filter is, for example, a film bulk acoustic resonator (FBAR) or a solidly mounted resonator (SMR). The BAW filter has a substrate. The substrate is, for example, a silicon substrate.

Each of the plurality of filters 601 and 602, the plurality of transmitting filters 611, 621, 631, and 641, and the plurality of receiving filters 612, 622, 632, and 642 is not limited to a ladder filter and may be, for example, a longitudinally coupled resonator-type surface acoustic wave filter.

Although the above-described acoustic wave filter is an acoustic wave filter using surface acoustic waves or bulk acoustic waves, the acoustic wave filter is not limited to this. The acoustic wave filer may be, for example, an acoustic wave filter using boundary acoustic waves, plate waves, or the like.

The communication apparatus 300 according to the first embodiment may include the high-frequency module 100*a* instead of the high-frequency module 100.

The high-frequency module 100 according to the first embodiment may include any of the directional couplers 8*a*, 8*b*, and 8*c* instead of the directional coupler 8.

The number of sub-lines 82 is two in the directional coupler 8, 8*a*, or 8*c* according to the first, second, or fourth embodiment, and the number of sub-lines 82 is three in the directional coupler 8*b* according to the third embodiment. The number of sub-lines 82, however, is not limited to two or three and may be, for example, one, or four or more.

The statement that "an element is arranged at a first principal surface of a board" in the present specification includes not only a case where the element is directly mounted on the first principal surface of the board but also a case where the element is arranged, of a space on the first principal surface side and a space on the second principal surface side which are separated by the board, in the space on the first principal surface side. That is, the statement that "the element is arranged at the first principal surface of the board" includes a case where the element is mounted above the first principal surface of the board with a different circuit element, electrode, or the like interposed therebetween. The element is, for example, an electronic component in the first group but is not limited to an electronic component in the first group. The board is, for example, the mounting board 10. If the board is the mounting board 10, the first principal surface is the first principal surface 101, and the second principal surface is the second principal surface 102.

The statement that "an element is arranged at a second principal surface of a board" in the present specification includes not only a case where the element is directly mounted on the second principal surface of the board but also a case where the element is arranged, of a space on the first principal surface side and a space on the second principal surface side which are separated by the board, in the space on the second principal surface side. That is, the statement that "the element is arranged at the second principal surface of the board" includes a case where the element is mounted above the second principal surface of the board with a different circuit element, electrode, or the like interposed therebetween. The element is, for example, an electronic component in the second group but is not limited to an electronic component in the second group. The board is, for example, the mounting board 10. If the board is the mounting board 10, the first principal surface is the first principal surface 101, and the second principal surface is the second principal surface 102.

Aspects

The present specification discloses the following aspects.

A directional coupler (8; 8*a*; 8*b*; 8*c*) according to a first aspect includes a main line (81), a first sub-line (821), a second sub-line (822), a termination circuit (83), a selector switch (84), and a short-circuiting switch (85). The termination circuit (83) terminates at least one of the first sub-line (821) and the second sub-line (822). The selector switch (84) connects the first sub-line (821) and the termination circuit (83) in a first mode and connects the second sub-line (822) and the termination circuit (83) in a second mode. The short-circuiting switch (85) short-circuits both ends (8221, 8222) of the second sub-line (822) in the first mode.

According to the above-described aspect, the both ends (8221, 8222) of the second sub-line (822) are short-circuited by the short-circuiting switch (85) in the first mode of connecting the first sub-line (821) and the termination circuit (83), and a closed circuit including the second sub-line (822) can be formed. For this reason, an electromagnetic field appearing around the second sub-line (822) can be inhibited from spreading, and the degree of coupling between the main line (81) and the second sub-line (822) can be weakened. As a result, it is possible to reduce leakage of a signal from the main line (81) to the second sub-line (822) and reduce loss of a signal transmitted through the main line (81).

A directional coupler (8; 8*a*; 8*b*) according to a second aspect further includes a second selector switch (86) in the first aspect. The second selector switch (86) is a switch different from a first selector switch (84) as the selector switch (84). The first selector switch (84) has a first terminal (840), a second terminal (841), and a third terminal (842). The first terminal (840) is connected to the termination circuit (83). The second terminal (841) is connected to the second selector switch (86). The third terminal (842) is connected to a first end (8221) of the second sub-line (822). The second selector switch (86) has a fourth terminal (860), a fifth terminal (861), and a sixth terminal (862). The fourth terminal (860) is connected to one end (8211) of the first sub-line (821). The fifth terminal (861) is connected to the second terminal (841) of the first selector switch (84). The sixth terminal (862) is connected to a second end (8222) of the second sub-line (822). The directional coupler (8; 8*a*; 8*b*) connects the first terminal (840) and the second terminal (841) of the first selector switch (84) and connects the fourth terminal (860) and the fifth terminal (861) of the second selector switch (86) in the first mode. The directional coupler (8; 8*a*; 8*b*) connects the first terminal (840) and the third terminal (842) of the first selector switch (84) and connects the fourth terminal (860) and the sixth terminal (862) of the second selector switch (86) in the second mode.

According to the above-described aspect, a sub-line in the second mode can be formed from the first sub-line (821) and the second sub-line (822) that are series-connected. For this reason, the size of the directional coupler (8; 8*a*; 8*b*) can be made smaller than in a case where the sub-line in the second mode is formed from one sub-line.

A directional coupler (8*a*) according to a third aspect further includes a phase circuit (88; 88*a*; 88*b*) in the second aspect. The phase circuit (88; 88*a*; 88*b*) is provided in a signal path (R1) between the one end (8211) of the first sub-line (821) and the second end (8222) of the second sub-line (822).

According to the above-described aspect, the directional coupler (8*a*) can be applied to a wide band.

In a directional coupler (8; 8*a*; 8*b*) according to a fourth aspect, in any one of the first to third aspects, the short-circuiting switch (85) includes a first FET, and the selector switch (84) includes a second FET. A gate width of the first FET is wider than a gate width of the second FET.

According to the above-described aspect, loss of a signal transmitted through the main line (81) can be reduced.

A directional coupler (8; 8*a*; 8*b*) according to a fifth aspect further includes a second selector switch (86) in the fourth aspect. The second selector switch (86) is a switch different from a first selector switch (84) as the selector switch (84). The second selector switch (86) includes a third FET. The gate width of the first FET is wider than a gate width of the third FET.

According to the above-described aspect, loss of a signal transmitted through the main line (81) can be further reduced.

A directional coupler (8) according to a sixth aspect further includes a multilayer board (10) in any one of the first to fifth aspects. The multilayer board (10) has the main line (81), the first sub-line (821), and the second sub-line (822) provided inside.

According to the above-described aspect, harmonic distortion can be reduced.

A directional coupler (8) according to a seventh aspect further includes an IC chip (13) in the sixth aspect. The IC chip (13) includes the selector switch (84) and the short-circuiting switch (85). The IC chip (13) is arranged at a principal surface (101) of the multilayer board (10).

According to the above-described aspect, wiring resistances of the main line (81), the first sub-line (821), and the second sub-line (822) can be reduced. As a result, it is possible to reduce signal loss.

A directional coupler (8*a*) according to an eighth aspect further includes a phase circuit (88; 88*a*; 88*b*) in the seventh aspect. The phase circuit (88; 88*a*; 88*b*) is provided in a signal path (R1) between the one end (8211) of the first sub-line (821) and one end (8222) of the second sub-line (822). The IC chip (13) further includes the phase circuit (88; 88*a*; 88*b*).

According to the above-described aspect, the main line (81) and the phase circuit (88; 88*a*; 88*b*) can be physically separated. As a result, it is possible to inhibit unnecessary coupling between the main line (81) and the phase circuit (88; 88*a*; 88*b*).

In a directional coupler (8) according to a ninth aspect, in the seventh or eighth aspect, the IC chip (13) overlaps with at least one of the main line (81), the first sub-line (821), and the second sub-line (822) in plan view from a thickness direction (D1) of the multilayer board (10).

According to the above-described aspect, a distance of connection between the IC chip (13) and the directional coupler (8) can be shortened. As a result, it is possible to reduce appearance of an unnecessary inductor.

A directional coupler (8*c*) according to a tenth aspect further includes a first short-circuiting switch (80) in the first aspect. The first short-circuiting switch (80) is different from a second short-circuiting switch (85) as the short-circuiting switch (85) and short-circuits both ends (8211, 8212) of the first sub-line (821) in the second mode.

According to the above-described aspect, both the ends (8221, 8222) of the second sub-line (822) are short-circuited by the second short-circuiting switch (85) in the first mode of connecting the first sub-line (821) and the termination circuit (83), and a closed circuit including the second sub-line (822) can be formed. For this reason, an electromagnetic field appearing around the second sub-line (822) can be inhibited from spreading, and the degree of coupling between the main line (81) and the second sub-line (822) can be weakened. As a result, it is possible to reduce leakage of a signal from the main line (81) to the second sub-line (822) and reduce loss of a signal transmitted through the main line (81).

Further, both the ends (8211, 8212) of the first sub-line (821) are short-circuited by the first short-circuiting switch (80) in the second mode of connecting the second sub-line (822) and the termination circuit (83), and a closed circuit including the first sub-line (821) can be formed. For this reason, an electromagnetic field appearing around the first sub-line (821) can be inhibited from spreading, and the degree of coupling between the main line (81) and the first sub-line (821) can be weakened. As a result, it is possible to reduce leakage of a signal from the main line (81) to the first sub-line (821) and reduce loss of a signal transmitted through the main line (81).

A high-frequency module (100; 100*a*) according to an eleventh aspect includes the directional coupler (8; 8*a*; 8*b*; 8*c*) according to any one of the first to tenth aspects and an antenna switch (55). The antenna switch (55) is connected to an antenna terminal (91).

According to the above-described aspect, the both ends (8221, 8222) of the second sub-line (822) are short-circuited by the short-circuiting switch (85) in the first mode of connecting the first sub-line (821) and the termination circuit (83), and a closed circuit including the second sub-line (822) can be formed. For this reason, an electromagnetic field appearing around the second sub-line (822) can be inhibited from spreading, and the degree of coupling between the main line (81) and the second sub-line (822) can be weakened. As a result, it is possible to reduce leakage of a signal from the main line (81) to the second sub-line (822) and reduce loss of a signal transmitted through the main line (81).

In a high-frequency module (100; 100*a*) according to a twelfth aspect, in the eleventh aspect, the antenna switch (55) is integral with the selector switch (84) and the short-circuiting switch (85) of the directional coupler (8; 8*a*; 8*b*; 8*c*).

According to the above-described aspect, the size of the high-frequency module (100; 100*a*) can be made smaller than in a case where the antenna switch (55) is separate from the selector switch (84) and the short-circuiting switch (85).

A communication apparatus (300) according to a thirteenth aspect includes the high-frequency module (100; 100*a*) according to the eleventh or twelfth aspect and a signal processing circuit (301). The signal processing circuit (301) is connected to the high-frequency module (100; 100*a*).

According to the above-described aspect, the both ends (8221, 8222) of the second sub-line (822) are short-circuited by the short-circuiting switch (85) in the first mode of connecting the first sub-line (821) and the termination circuit (83), and a closed circuit including the second sub-line (822) can be formed. For this reason, an electromagnetic field appearing around the second sub-line (822) can be inhibited from spreading, and the degree of coupling between the main line (81) and the second sub-line (822) can be weakened. As a result, it is possible to reduce leakage of a signal from the main line (81) to the second sub-line (822) and reduce loss of a signal transmitted through the main line (81).

What is claimed is:

1. A directional coupler comprising:
- a main line;
- a first sub-line;
- a second sub-line;
- a termination circuit configured to terminate the first sub-line or the second sub-line;
- a first selector switch configured to selectively connect the first sub-line to the termination circuit in a first mode, and selectively connect the second sub-line to the termination circuit in a second mode; and
- a second short-circuiting switch configured to short-circuit both ends of the second sub-line in the first mode.

2. The directional coupler according to claim 1, further comprising:
- a second selector switch which is different from the first selector switch,
- wherein the first selector switch comprises:
  - a first terminal connected to the termination circuit,
  - a second terminal connected to the second selector switch, and
  - a third terminal connected to a first end of the second sub-line,
- wherein the second selector switch comprises:
  - a fourth terminal connected to a first end of the first sub-line,
  - a fifth terminal connected to the second terminal of the first selector switch, and
  - a sixth terminal connected to a second end of the second sub-line,
- wherein in the first mode, the directional coupler is configured to:
  - connect the first terminal to the second terminal of the first selector switch, and
  - connect the fourth terminal to the fifth terminal of the second selector switch, and
- wherein in the second mode, the directional coupler is configured to:
  - connect the first terminal to the third terminal of the first selector switch, and
  - connect the fourth terminal to the sixth terminal of the second selector switch.

3. The directional coupler according to claim 2, further comprising:
- a phase circuit in a signal path between the first end of the first sub-line and the second end of the second sub-line.

4. The directional coupler according to claim 1, wherein:
- the second short-circuiting switch comprises a first field-effect transistor (FET),
- the first selector switch comprises a second FET, and
- a gate width of the first FET is wider than a gate width of the second FET.

5. The directional coupler according to claim 4, further comprising:
- a second selector switch which is different from the first selector switch, wherein:
- the second selector switch comprises a third FET, and
- the gate width of the first FET is wider than a gate width of the third FET.

6. The directional coupler according to claim 1, further comprising:

a multilayer board, wherein the main line, the first sub-line, and the second sub-line are inside the multilayer board.

7. The directional coupler according to claim 6, further comprising:

an integrated circuit (IC) chip comprising the first selector switch and the second short-circuiting switch, wherein the IC chip is physically arranged on a principal surface of the multilayer board.

8. The directional coupler according to claim 7, further comprising:

a phase circuit in a signal path between the first end of the first sub-line and a first end of the second sub-line, wherein the IC chip further comprises the phase circuit.

9. The directional coupler according to claim 7, wherein the IC chip overlaps with the main line, the first sub-line, or the second sub-line in plan view from a thickness direction of the multilayer board.

10. The directional coupler according to claim 1, further comprising:

a first short-circuiting switch which is different from the second short-circuiting switch and is configured to short-circuit both ends of the first sub-line in the second mode.

11. A high-frequency module comprising:

the directional coupler according to claim 1; and an antenna switch connected to an antenna terminal.

12. The high-frequency module according to claim 11, wherein the antenna switch is integral with the first selector switch and the second short-circuiting switch of the directional coupler.

13. A communication apparatus comprising:

the high-frequency module according to claim 11; and a signal processing circuit connected to the high-frequency module.

* * * * *